US012691859B2

(12) United States Patent
Kim

(10) Patent No.: US 12,691,859 B2
(45) Date of Patent: Jul. 28, 2026

(54) ELECTRONIC BRAKE SYSTEM AND OPERATION METHOD THEREOF

(71) Applicant: HL MANDO CORPORATION, Gyeonggi-do (KR)

(72) Inventor: Jinseok Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 660 days.

(21) Appl. No.: 18/015,060

(22) PCT Filed: Jul. 7, 2021

(86) PCT No.: PCT/KR2021/008682
§ 371 (c)(1),
(2) Date: Mar. 8, 2023

(87) PCT Pub. No.: WO2022/010272
PCT Pub. Date: Jan. 13, 2022

(65) Prior Publication Data
US 2023/0303046 A1 Sep. 28, 2023

(30) Foreign Application Priority Data

Jul. 7, 2020 (KR) ........................ 10-2020-0083660
Jul. 7, 2021 (KR) ........................ 10-2021-0089333

(51) Int. Cl.
*B60T 13/66* (2006.01)
*B60T 7/06* (2006.01)
*B60T 13/14* (2006.01)

(52) U.S. Cl.
CPC ................ *B60T 13/66* (2013.01); *B60T 7/06* (2013.01); *B60T 13/142* (2013.01); *B60T 13/148* (2013.01)

(58) Field of Classification Search
CPC ... B60T 7/04; B60T 7/06; B60T 13/14; B60T 13/66; B60T 13/142; B60T 13/148
(Continued)

(56) References Cited

U.S. PATENT DOCUMENTS

2018/0111593 A1* 4/2018 Kim ........................ B60T 8/88
2018/0162341 A1* 6/2018 Irwan .................... B60T 13/686
(Continued)

FOREIGN PATENT DOCUMENTS

EP           2520473        7/2015
KR    10-2017-0128543      11/2017
(Continued)

OTHER PUBLICATIONS

International Search Report for PCT/KR2021/008682 mailed on Oct. 18, 2021 and its English Translation provided by the WIPO (now published as WO 2022/010272).
(Continued)

*Primary Examiner* — Robert A. Siconolfi
*Assistant Examiner* — San M Aung
(74) *Attorney, Agent, or Firm* — WOMBLE BOND DICKINSON (US) LLP

(57) ABSTRACT

An electronic brake system is disclosed. An electronic brake system according to the present embodiment may be provided by including: a reservoir in which a pressure medium is stored; an integrated master cylinder which is connected to a brake pedal to discharge the pressure medium by an operation of the brake pedal and provides a pedal feeling to driver; a hydraulic pressure supply device for operating a hydraulic piston by an electrical signal output corresponding to a displacement of the brake pedal, to generate a hydraulic pressure in a single pressure chamber; and a hydraulic pressure control unit which is provided between the hydraulic pressure supply device and multiple wheel cylinders and
(Continued)

controls a flow of the pressure medium supplied to the multiple wheel cylinders.

14 Claims, 7 Drawing Sheets

(58) Field of Classification Search
USPC .......................................................... 303/20
See application file for complete search history.

(56) References Cited

U.S. PATENT DOCUMENTS

| | | | | |
|---|---|---|---|---|
| 2018/0339692 A1* | 11/2018 | Jeong | .................... | B60T 13/686 |
| 2019/0232935 A1* | 8/2019 | Kim | ...................... | B60T 13/686 |
| 2019/0366997 A1* | 12/2019 | Jeong | .................... | B60T 13/167 |
| 2020/0108813 A1* | 4/2020 | Kim | ...................... | B60T 13/662 |
| 2020/0139949 A1* | 5/2020 | Dolmaya | .............. | B60T 8/4081 |
| 2022/0017052 A1* | 1/2022 | Kim | ...................... | B60T 8/4081 |

FOREIGN PATENT DOCUMENTS

| | | | | |
|---|---|---|---|---|
| KR | 10-2018-0109179 | 10/2018 | | |
| KR | 10-2018-0128187 | 12/2018 | | |
| WO | 2014/126054 | 8/2014 | | |
| WO | WO-2020106114 A1 * | 5/2020 | ............ | B60T 8/4081 |

OTHER PUBLICATIONS

Written Opinion of the International Searching Authority for PCT/KR2021/008682 mailed on Oct. 18, 2021 and its English Machine Translation by Google Translate (now published as WO 2022/010272).

* cited by examiner

[Fig. 1]
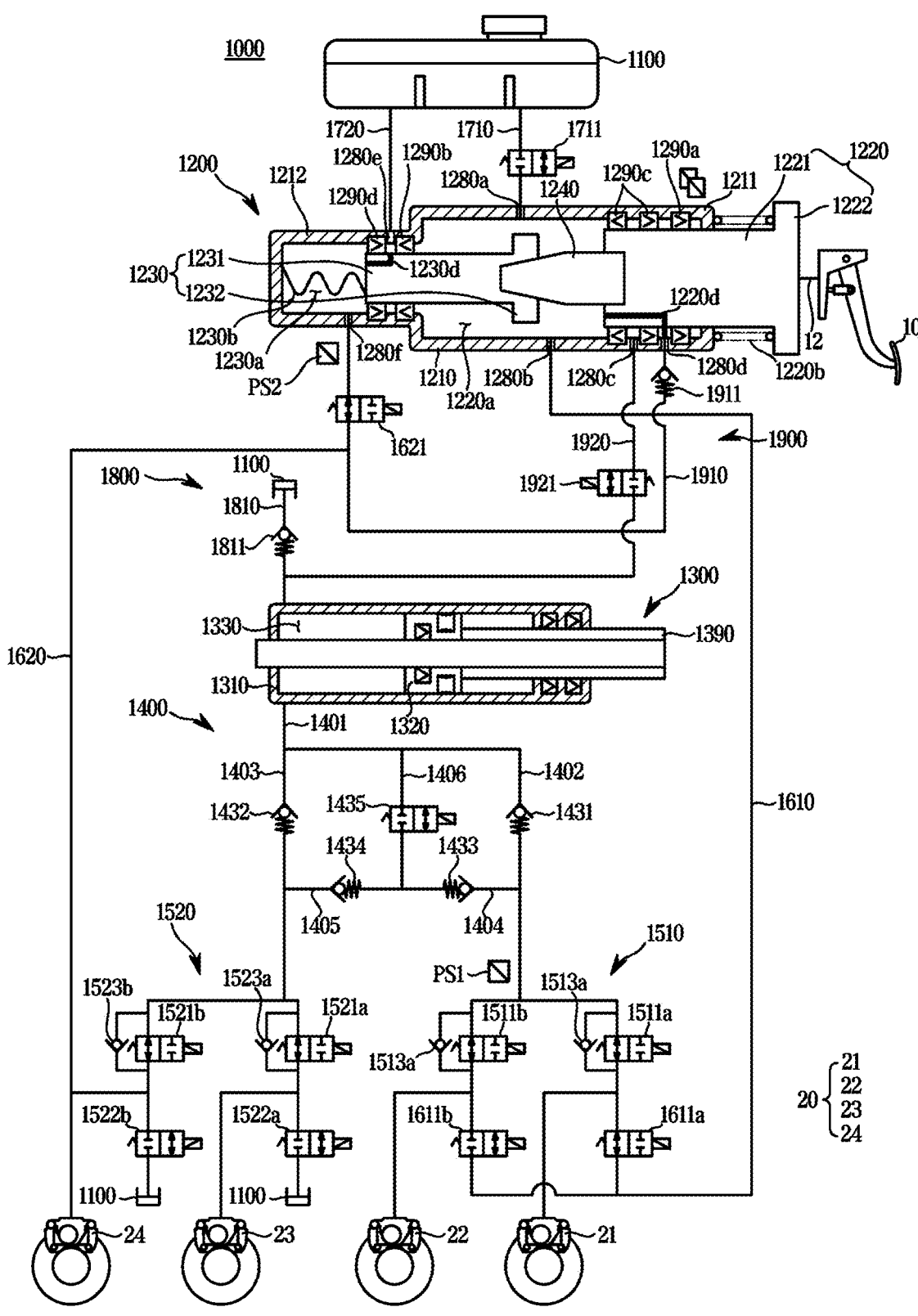

[Fig. 2]
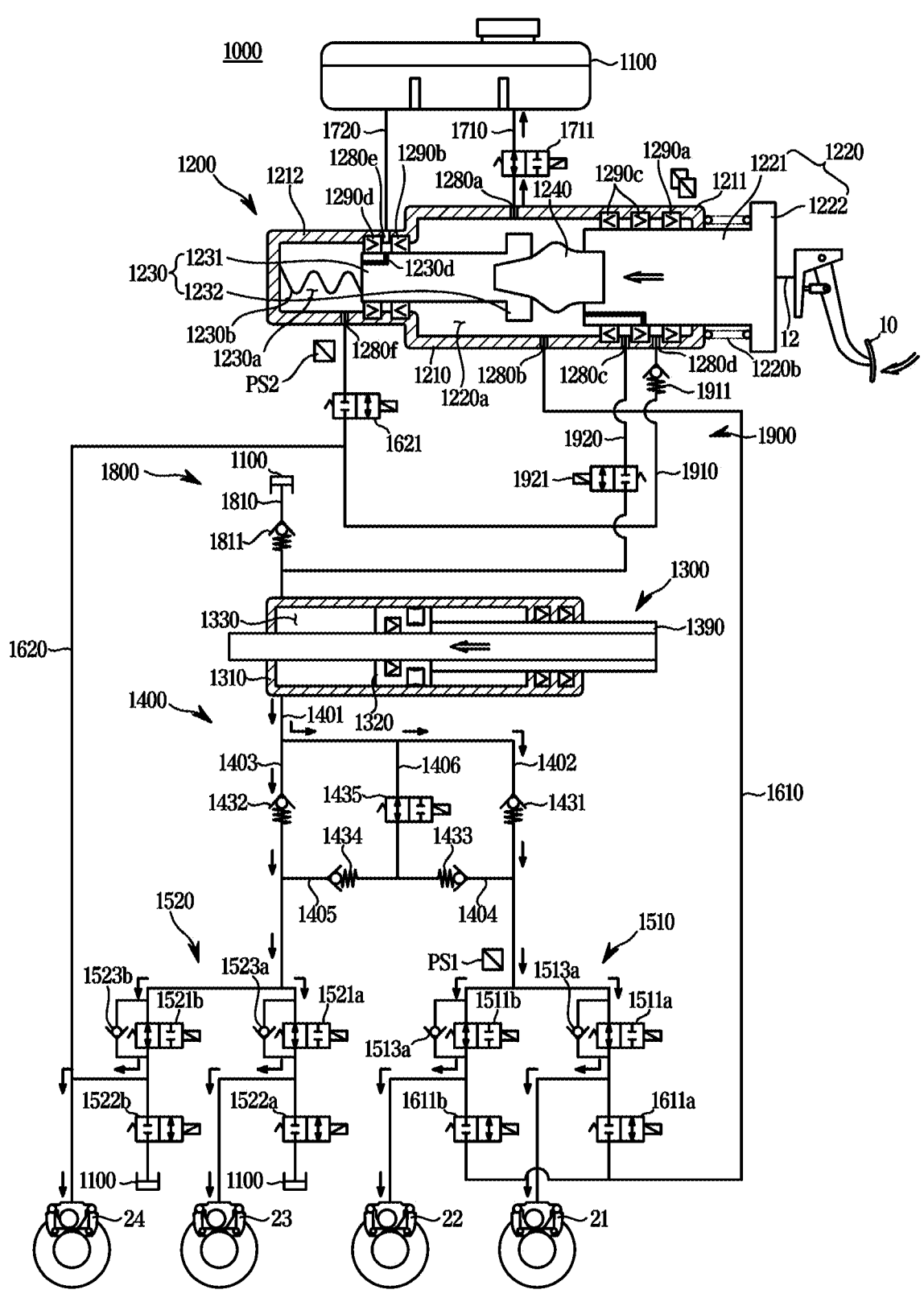

[Fig. 3]
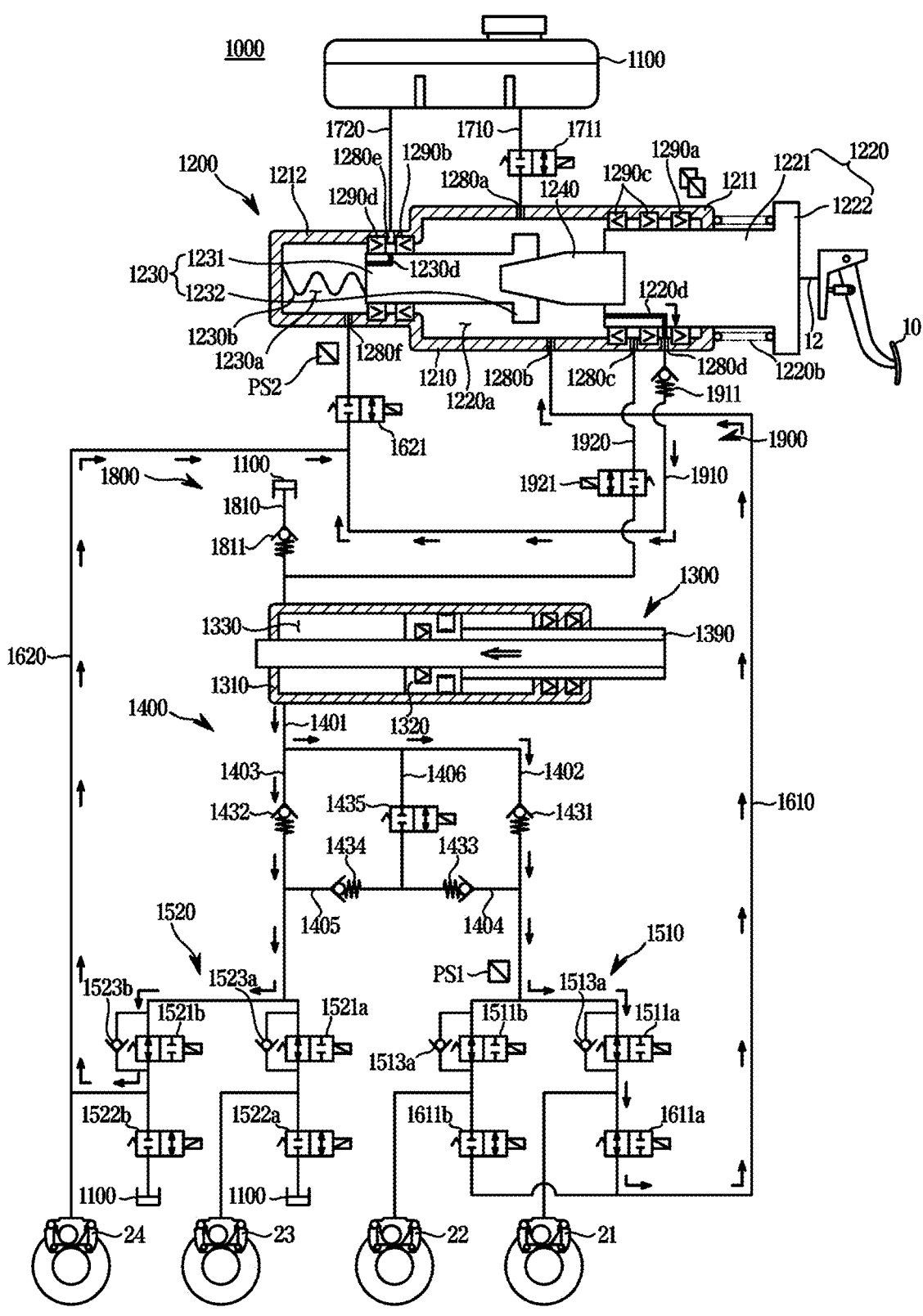

[Fig. 4]
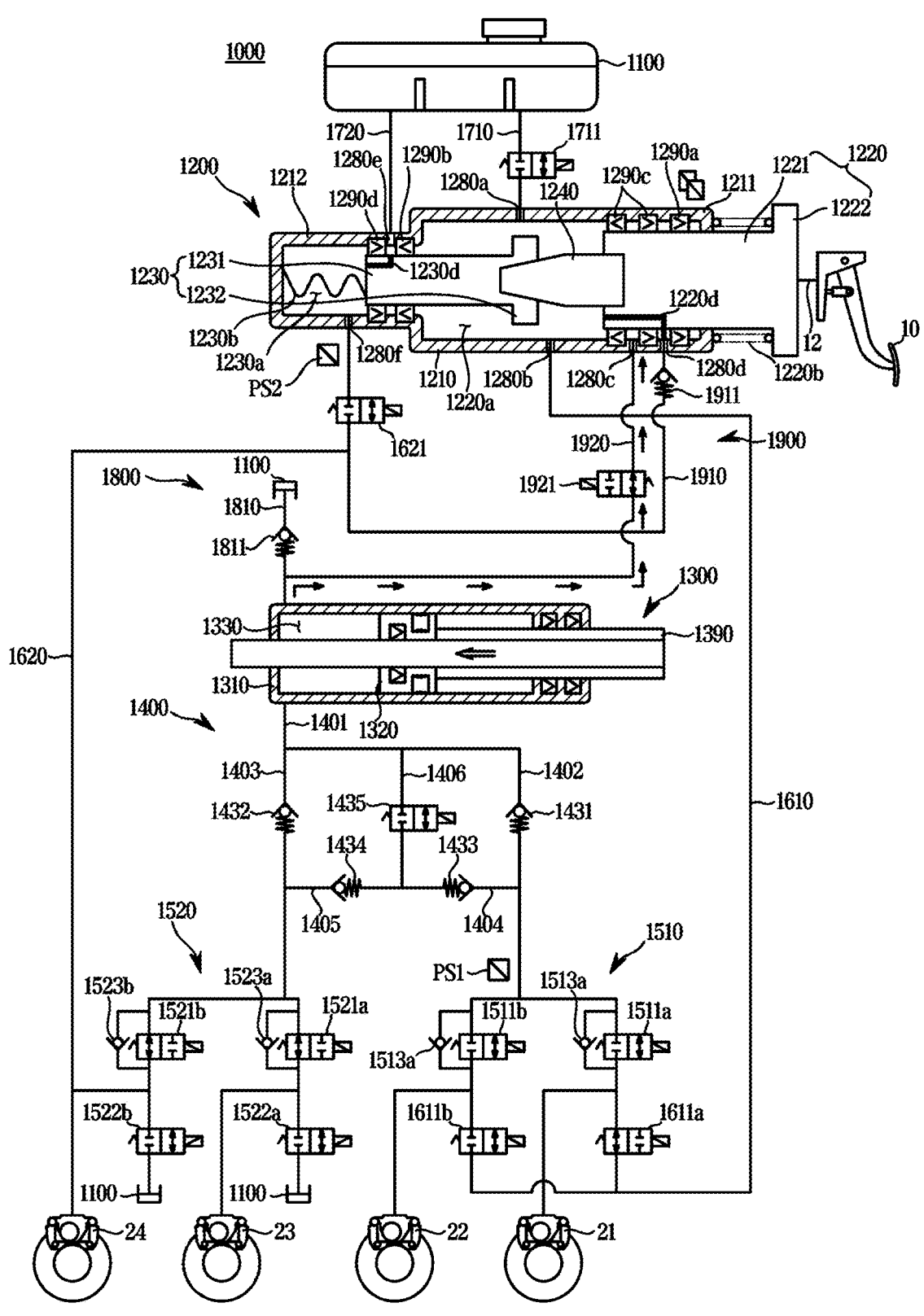

[Fig. 5]
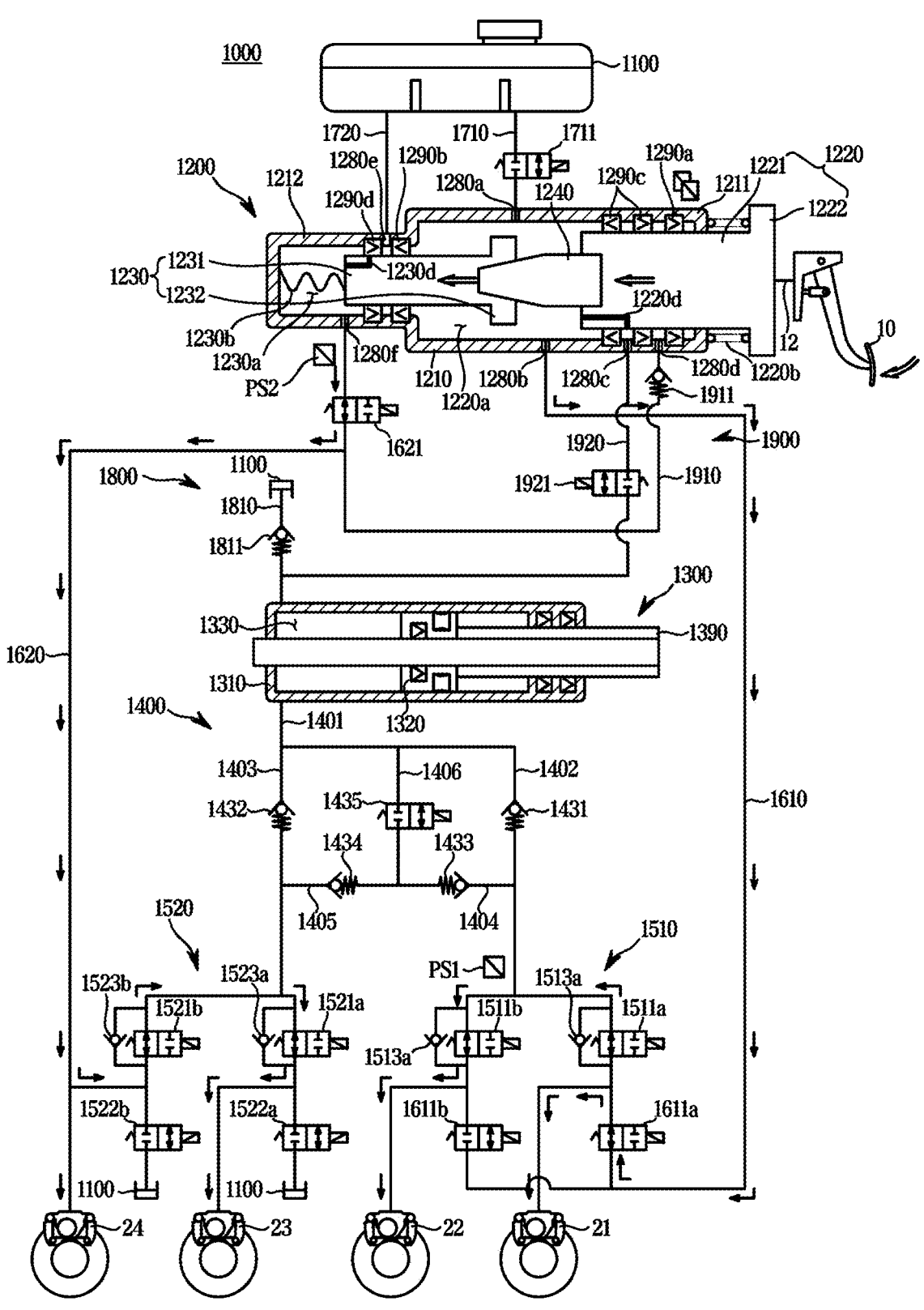

[Fig. 6]
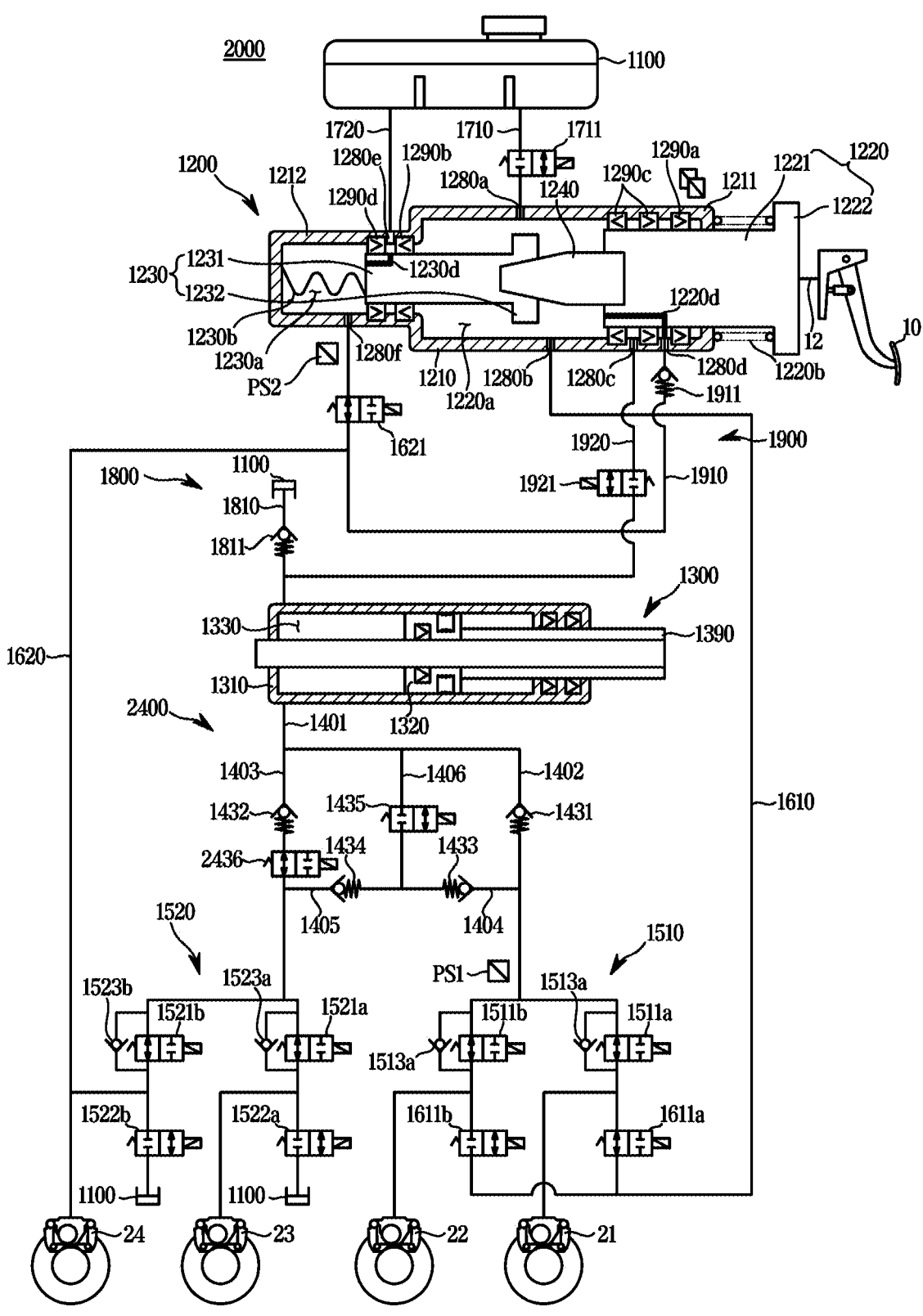

[Fig. 7]
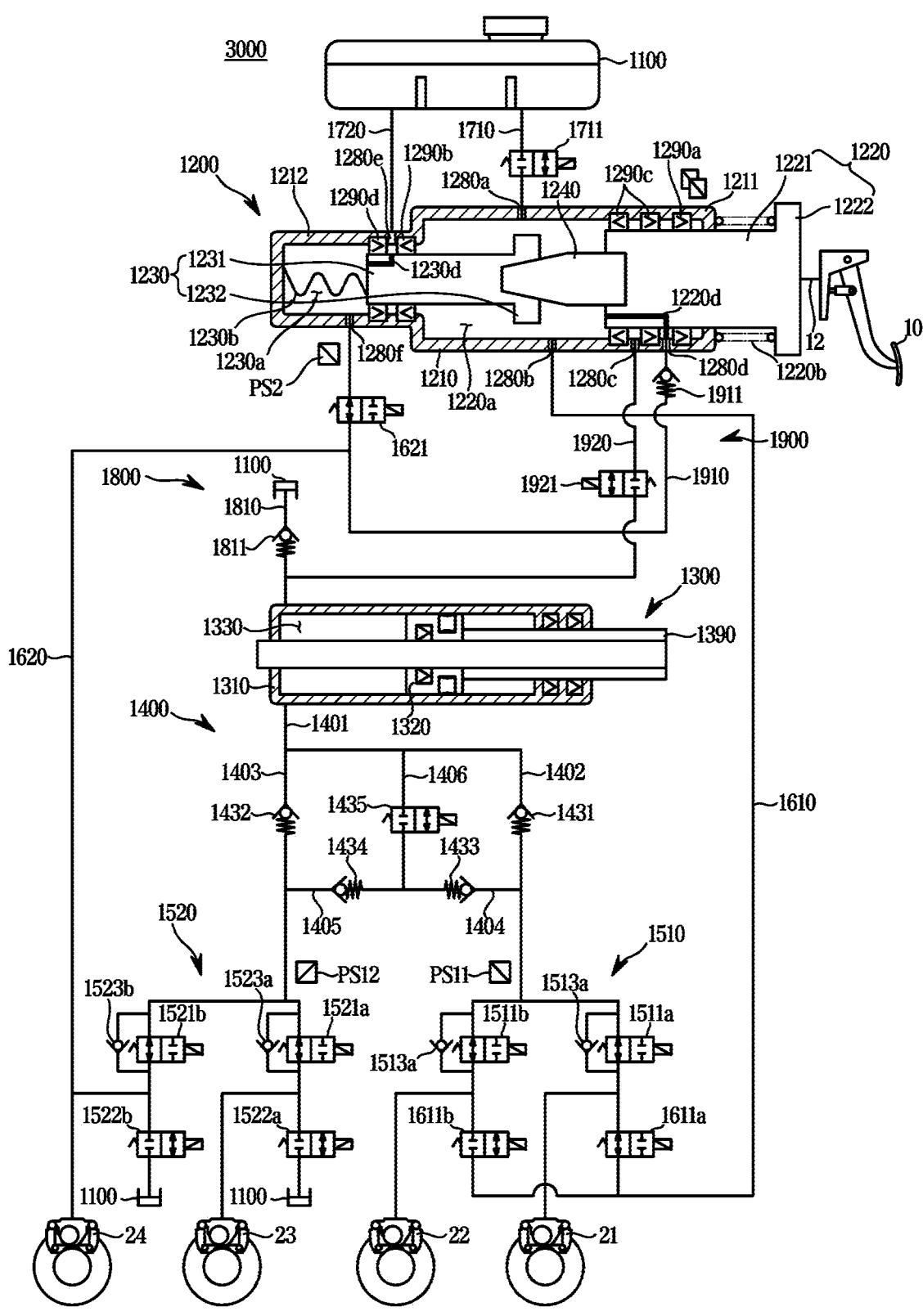

ELECTRONIC BRAKE SYSTEM AND OPERATION METHOD THEREOF

CROSS-REFERENCE TO RELATED APPLICATIONS

The present application is the U.S. National Phase of PCT Application No. PCT/KR2021/008682 filed on Jul. 7, 2021, which claims the priority to Korean Patent Application No. 10-2020-0083660 filed with the Korean Intellectual Property Office on Jul. 7, 2020, and Korean Patent Application No, 10-2021-0089333 filed with the Korean Intellectual Property Office on Jul. 7, 2021, the entire contents of which are incorporated herein by reference.

TECHNICAL FIELD

The present invention relates to an electronic brake system and an operation method thereof, and more specifically, to an electronic brake system, which generates a braking force using an electrical signal corresponding to a displacement of a brake pedal, and an operation method thereof.

BACKGROUND ART

A brake system for performing braking is necessarily mounted on vehicles, and various types of brake systems have been proposed for the safety of drivers and passengers.

Conventional brake systems mainly use a method of supplying a hydraulic pressure necessary for braking to wheel cylinders using a mechanically connected booster when a driver steps on a brake pedal. However, as the market demand for implementing various braking functions specifically in response to the operating environment of the vehicles increases, recently, an electronic brake system for receiving a driver's braking intention as an electrical signal from a pedal displacement sensor for detecting a displacement of a brake pedal when a driver steps on the brake pedal and operating a hydraulic pressure supply device on the basis of the above to supply a hydraulic pressure required for braking to wheel cylinders is widely used.

The electronic brake system generates a brake pedal operation of the driver in a normal operation mode or braking determination when the vehicle autonomously travels as an electrical signal and provides the electrical signal, and electrically operates and controls the hydraulic pressure supply device on the basis of the above to form and transmit the hydraulic pressure required for braking to the wheel cylinders. As described above, the electronic brake system and the operation method thereof are electrically operated and controlled and thus may implement complicated and various braking actions, but when technical problems occur in electronic components, there is a concern that the hydraulic pressure required for braking is not stably generated, thereby endangering the safety of passengers.

Therefore, the electronic brake system enters an abnormal operation mode when one component fails or is out of control, and at this time, there is a need for a mechanism in which the driver's brake pedal operation is directly linked to the wheel cylinders. In other words, in the abnormal operation mode of the electronic brake system, a hydraulic pressure required for braking needs to be immediately generated when the driver applies a pedal force to the brake pedal, and the hydraulic pressure needs to be directly transmitted to the wheel cylinders. Furthermore, there is a need for a method of accurately and quickly inspecting whether the electronic brake system fails in order to quickly enter the abnormal operation mode upon emergency and achieve the safety of passengers.

Technical Problem

The embodiment provides an electronic brake system and an operation method thereof capable of effectively implementing braking even in various operation situations.

The embodiment provides an electronic brake system and an operation method thereof capable of quickly determining whether a device fails through a simple structure and operation.

The embodiment provides an electronic brake system, which has improved braking performance and operation reliability, and an operation method thereof.

The embodiment provides an electronic brake system, which reduces loads applied to components to improve durability, and an operation method thereof.

The embodiment provides an electronic brake system and an operation method thereof capable of improving the assemblability and productivity of a product and at the same time, reducing a manufacturing cost of the product.

Technical Solution

In accordance with one aspect of the present invention, an electronic brake system includes an integrated master cylinder including a master piston displaced by an operation of a brake pedal, a master chamber having a volume changed by a displacement of the master piston, and a pedal simulator compressed by the displacement of the master piston and configured to provide a pedal feeling through an elastic restoring force generated by the compression, a hydraulic pressure supply device including a hydraulic piston operated by an electrical signal output in response to a displacement of the brake pedal and configured to generate a hydraulic pressure of a pressure medium and a single pressure chamber provided on one side of the hydraulic piston, a hydraulic pressure control unit including a first hydraulic circuit configured to control a flow of a pressure medium supplied to a first wheel cylinder and a second wheel cylinder and a second hydraulic circuit configured to control a flow of a pressure medium supplied to a third wheel cylinder and a fourth wheel cylinder, and configured to control the flow of the pressure medium supplied to the first and second hydraulic circuits from the hydraulic pressure supply device, and an electronic control unit configured to control valves on the basis of hydraulic pressure information and displacement information of the brake pedal, wherein the hydraulic pressure control unit includes a first hydraulic pressure flow path communicating with the pressure chamber, a second hydraulic pressure flow path branched from the first hydraulic pressure flow path and connected to the first hydraulic circuit, a third hydraulic pressure flow path branched from the first hydraulic pressure flow path and connected to the second hydraulic circuit, a fourth hydraulic pressure flow path communicating with the first hydraulic circuit, a fifth hydraulic pressure flow path communicating with the second hydraulic circuit, and a sixth hydraulic pressure flow path joined to the fourth hydraulic pressure flow path and the fifth hydraulic pressure flow path and communicating with the pressure chamber.

The hydraulic pressure control unit may include a first valve provided on the second hydraulic pressure flow path and configured to control the flow of the pressure medium, a second valve provided on the third hydraulic pressure flow path and configured to control the flow of the pressure medium, a third valve provided on the fourth hydraulic pressure flow path and configured to control the flow of the pressure medium, a fourth valve provided on the fifth hydraulic pressure flow path and configured to control the flow of the pressure medium, and a fifth valve provided on the sixth hydraulic pressure flow path and configured to control the flow of the pressure medium.

The first valve may be provided as a check valve configured to allow only a flow of a pressure medium discharged from the pressure chamber, the second valve may be provided as a check valve configured to allow only the flow of the pressure medium discharged from the pressure chamber, the third valve may be provided as a check valve configured to allow only a flow of a pressure medium discharged from the first hydraulic circuit, the fourth valve may be provided as a check valve configured to allow only a flow of a pressure medium discharged from the second hydraulic circuit, and the fifth valve may be provided as a solenoid valve configured to control a bidirectional flow of the pressure medium.

The electronic brake system may further include a circuit pressure sensor configured to detect a hydraulic pressure provided by the hydraulic pressure supply device, a cylinder pressure sensor configured to detect a hydraulic pressure of the master chamber, an inspection flow path communicating with the master chamber and connected to receive the hydraulic pressure from the hydraulic pressure supply device, and an inspection valve provided on the inspection flow path and configured to control the flow of the pressure medium.

The integrated master cylinder may further include a first master piston connected to the brake pedal, a first master chamber having a volume changed by a displacement of the first master piston, a second master piston provided to be displaced by the displacement of the first master piston or a hydraulic pressure of the first master chamber, and a second master chamber having a volume changed by a displacement of the second master piston, and the cylinder pressure sensor may detect a hydraulic pressure of the second master chamber.

The electronic brake system may further include a first backup flow path connecting the first master chamber and the first hydraulic circuit and a second backup flow path connecting the second master chamber and the second hydraulic circuit, wherein the inspection flow path may include a first inspection flow path having one end connected to the first master chamber and the other end connected to the second backup flow path, and the inspection valve may include an inspection check valve provided on the first inspection flow path and configured to allow only a flow of a pressure medium discharged from the first master chamber.

The integrated master cylinder may further include a first sealing member configured to seal the first master chamber from the outside and a second sealing member configured to seal the first master chamber with respect to the second master chamber.

The electronic brake system may further include a reservoir configured to store the pressure medium, a first reservoir flow path connecting the reservoir and the first master chamber, and a simulator valve provided on the first reservoir flow path and configured to control a flow of a pressure medium between the reservoir and the first master chamber.

The electronic brake system may further include at least one first cut valve provided on the first backup flow path and configured to control the flow of the pressure medium and a second cut valve provided on the second backup flow path and configured to control the flow of the pressure medium.

The inspection flow path may further include a second inspection flow path having one end connected to the first master chamber and the other end connected to the pressure chamber, and the inspection valve may further include an inspection control valve provided on the second inspection flow path and configured to control a bidirectional flow of the pressure medium.

The integrated master cylinder may further include a third sealing member configured to block a flow of a pressure medium introduced into the first master chamber from the second inspection flow path, the first sealing member may be provided behind the third sealing member, and the first inspection flow path may be connected between the first sealing member and the third sealing member on the integrated master cylinder.

The electronic brake system may further include a reservoir configured to store the pressure medium and a second reservoir flow path connecting the reservoir and the second master chamber, wherein the integrated master cylinder may further include a fourth sealing member configured to block a flow of a pressure medium discharged from the second master chamber to the second reservoir flow path.

The first cut valve may include a first dump valve configured to control a flow of a pressure medium between the first wheel cylinder and the first backup flow path and a second dump valve configured to control a flow of a pressure medium between the second wheel cylinder and the first backup flow path.

An operation method of an electronic brake system includes a first inspection mode in which whether there is a leakage in the integrated master cylinder or the simulator valve is inspected, wherein, in the first inspection mode, the hydraulic piston may be operated to supply the hydraulic pressure generated in the pressure chamber to the first master chamber by the hydraulic pressure control unit, the first and second hydraulic circuits, the first and second backup flow paths, and the first inspection flow path, and the electronic control unit may compare a hydraulic pressure value detected by the circuit pressure sensor and a hydraulic pressure value detected by the cylinder pressure sensor and determine whether there is a leakage.

An operation method of an electronic brake system includes a second inspection mode in which whether there is a leakage in the integrated master cylinder or the simulator valve is inspected, wherein, in the second inspection mode, the inspection control valve may be opened to communicate the pressure chamber with the first master chamber by the second inspection flow path, and the hydraulic piston may be operated to generate the hydraulic pressure in the pressure chamber, and the electronic control unit may determine whether there is a leakage on the basis of an amount of displacement of the hydraulic piston.

An operation method of an electronic brake system includes a regenerative braking mode by the generator, wherein, in the regenerative braking mode, the hydraulic piston may be operated and the hydraulic pressure generated in the pressure chamber may be provided to the first hydraulic circuit sequentially via the first hydraulic circuit and the second hydraulic circuit, and the sixth valve may be closed to block the hydraulic pressure from being provided to the second hydraulic circuit.

Advantageous Effects

According to an electronic brake system and an operation method thereof according to an embodiment, it is possible to stably and effectively implement braking in various operation situations of a vehicle.

According to the electronic brake system and the operation method thereof according to the embodiment, it is possible to quickly and accurately determine whether a device fails through a simple structure and operation.

According to the electronic brake system and the operation method thereof according to the embodiment, it is possible to improve braking performance and operation reliability.

According to the electronic brake system and the operation method thereof according to the embodiment, it is possible to stably provide a braking pressure even when components fail or a pressure medium leaks.

According to the electronic brake system and the operation method thereof according to the embodiment, it is possible to reduce loads applied to components, thereby improving durability of a product.

According to the electronic brake system and the operation method thereof according to the embodiment, it is possible to improve the assemblability and productivity of a product, and at the same time, reduce a manufacturing cost of the product.

DESCRIPTION OF DRAWINGS

FIG. 1 is a hydraulic circuit diagram showing an electronic brake system according to a first embodiment of the present invention.

FIG. 2 is a hydraulic circuit diagram showing a state in which the electronic brake system according to the first embodiment of the present invention performs braking in a normal operation mode.

FIG. 3 is a hydraulic circuit diagram showing a state in which the electronic brake system according to the first embodiment of the present invention performs a first inspection mode.

FIG. 4 is a hydraulic circuit diagram showing a state in which the electronic brake system according to the first embodiment of the present invention performs a second inspection mode.

FIG. 5 is a hydraulic circuit diagram showing a state in which the electronic brake system according to the first embodiment of the present invention performs braking in an abnormal operation mode (fall-back mode).

FIG. 6 is a hydraulic circuit diagram showing an electronic brake system according to a second embodiment of the present invention.

FIG. 7 is a hydraulic circuit diagram showing an electronic brake system according to a third embodiment of the present invention.

MODES OF THE INVENTION

Hereinafter, embodiments of the present invention will be described in detail with reference to the accompanying drawings. The following embodiments are presented to sufficiently convey the spirit of the present invention to those skilled in the art to which the present invention pertains. The present invention may also be specified in other forms without being limited to only the embodiments presented herein. In the drawings, in order to clarify the present invention, illustration of parts irrelevant to the description may be omitted, and the sizes of components may be slightly exaggerated for better understanding.

FIG. 1 is a hydraulic circuit diagram showing an electronic brake system 1000 according to a first embodiment of the present invention.

Referring to FIG. 1, the electronic brake system 1000 according to the first embodiment of the present invention includes a reservoir 1100 for storing a pressure medium, an integrated master cylinder 1200 for providing a reaction force according to a pedal force of a brake pedal 10 to a driver and at the same time, pressing and discharging the pressure medium, such as brake oil accommodated therein, a hydraulic pressure supply device 1300 for receiving a driver's braking intention as an electrical signal by a pedal displacement sensor for detecting a displacement of the brake pedal 10 and generating a hydraulic pressure of the pressure medium through a mechanical operation, a hydraulic pressure control unit 1400 for controlling the hydraulic pressure provided from the hydraulic pressures supply device 1300, hydraulic circuits 1510 and 1520 having a wheel cylinder 20 for receiving the hydraulic pressure of the pressure medium and performing braking of each vehicle wheel RR, RL, FR, and FL, a hydraulic dump device 1800 provided between the hydraulic pressure supply device 1300 and the reservoir 1100 to control a flow of the pressure medium, backup flow paths 1610 and 1620 hydraulically connecting the integrated master cylinder 1200 and the hydraulic circuits 1510 and 1520, a reservoir flow path 1700 hydraulically connecting the reservoir 1100 and the integrated master cylinder 1200, an inspection flow path 1900 connected to a master chamber of the integrated master cylinder 1200, and an electronic control unit (ECU) (not shown) for controlling the hydraulic pressure supply device 1300 and various valves on the basis of hydraulic pressure information and pedal displacement information.

When the driver applies a pedal force to the brake pedal 10 for a braking operation, the integrated master cylinder 1200 is provided to provide a reaction force against the pedal force to the driver to provide a stable pedal feeling and at the same time, press and discharge the pressure medium accommodated therein by the operation of the brake pedal 10.

The integrated master cylinder 1200 may have a simulation device for providing the pedal feeling to the driver and a master cylinder unit for pressing and discharging the pressure medium accommodated therein by the pedal force of the brake pedal, which are disposed coaxially in one cylinder body 1210.

Specifically, the integrated master cylinder 1200 may include the cylinder body 1210 forming a chamber therein, a first master chamber 1220a formed on an inlet of the cylinder body 1210 to which the brake pedal 10 is connected, a first master piston 1220 provided in the first master chamber 1220a, connected to the brake pedal 10, and provided to be displaced by the operation of the brake pedal 10, a second master chamber 1230a formed inside or in front of (left based on FIG. 1) the first master chamber 1220a in the cylinder body 1210, a second master piston 1230 provided in the second master chamber 1230a and provided to be displaced by a displacement of the first master piston 1220 or the hydraulic pressure of the pressure medium accommodated in the first master chamber 1220a, and a pedal simulator 1240 disposed between the first master piston 1220 and the second master piston 1230 to provide the pedal feeling through an elastic restoring force generated upon compression.

The first master chamber 1220a and the second master chamber 1230a may be sequentially formed in the cylinder body 1210 of the integrated master cylinder 1200 from the brake pedal 10 (right based on FIG. 1) to an inner side (left based on FIG. 1). In addition, the first master piston 1220 and the second master piston 1230 may be respectively provided in the first master chamber 1220a and the second master chamber 1230*a*, and may generate a hydraulic pressure or generate a negative pressure to the pressure medium accommodated in each chamber due to the advance and retreat movements.

The cylinder body 1210 may include a large-diameter portion 1211 having the first master chamber 1220*a* formed therein and formed to have a relatively large inner diameter and a small-diameter portion 1212 having the second master chamber 1230*a* formed therein and formed to have a relatively smaller inner diameter than the large-diameter portion 1211. The large-diameter portion 1211 and the small-diameter portion 1212 of the cylinder body 1210 may be integrally formed.

The first master chamber 1220*a* may be formed inside the large-diameter portion 1211, which is an inlet or rear side (right based on FIG. 1) of the cylinder body 1210, and the first master piston 1220 connected to the brake pedal 10 via an input rod 12 may be accommodated to be reciprocated in the first master chamber 1220*a*.

In the first master chamber 1220*a*, the pressure medium may be introduced and discharged through a first hydraulic port 1280*a*, a second hydraulic port 1280*b*, a third hydraulic port 1280*c*, and a fourth hydraulic port 1280*d*. The first hydraulic port 1280*a* may be connected to a first reservoir flow path 1710 to be described below to allow the pressure medium to be introduced into the first master chamber 1220*a* from the reservoir 1100 or the pressure medium accommodated in the first master chamber 1220*a* to be discharged to the reservoir 1100, and the second hydraulic port 1280*b* may be connected to the first backup flow path 1610 to be described below to allow the pressure medium to be discharged from the first master chamber 1220*a* toward the first backup flow path 1610 or conversely allow the pressure medium to be introduced into the first master chamber 1220*a* from the first backup flow path 1610.

In addition, the first master chamber 1220*a* may be connected to each of first and second inspection flow paths 1910 and 1920 of the inspection flow path 1900 to be described below through the third hydraulic port 1280*c* and the fourth hydraulic port 1280*d* to allow the pressure medium accommodated in the first master chamber 1220*a* to be discharged toward the inspection flow path 1900 or the pressure medium to be introduced into the first master chamber 1220*a* from the inspection flow path 1900. A detailed description thereof will be described below.

The first master piston 1220 may be provided to be accommodated in the first master chamber 1220*a* and may advance (leftward based on FIG. 1) to press the pressure medium accommodated in the first master chamber 1220*a* to generate a hydraulic pressure or retreat (rightward based on FIG. 1) to generate a negative pressure in the first master chamber 1220*a*. The first master piston 1220 may include a first body 1221 formed in a cylindrical shape to be in close contact with an inner circumferential surface of the first master chamber 1220*a* and a first flange 1222 formed to extend from a rear end (right end based on FIG. 1) of the first body 1221 in a radial direction and to which the input rod 12 is connected. The first master piston 1220 may be elastically supported by a first piston spring 1220*b*, and the first piston spring 1220*b* may be provided to have one end supported by a front surface (left surface based on FIG. 1) of the first flange 1222 and the other end supported by an outer surface of the cylinder body 1210.

The first master piston 1220 is provided with a first cutoff hole 1220*d* communicating with the first master chamber 1220*a*, and at the same time, communicating with the fourth hydraulic port 1280*d* and the first inspection flow path 1910 in a non-operating state, that is, a preparation state before the displacement occurs. In addition, a first sealing member 1290*a* for sealing the first master chamber 1220*a* from the outside may be provided between an outer circumferential surface of the first master piston 1220 and the cylinder body 1210. The first sealing member 1290*a* may be seated in an accommodating groove formed to be recessed on an inner circumferential surface of the cylinder body 1210 and provided to be in contact with the outer circumferential surface of the first master piston 1220, and may prevent the pressure medium accommodated in the first master chamber 1220*a* from leaking to the outside by the first sealing member 1290*a*, and at the same time, prevent external foreign substances from being introduced into the first master chamber 1220*a*. The first sealing member 1290*a* may be provided on an outermost side of the inner circumferential surface of the cylinder body 1210, that is, a rear side (right based on FIG. 1) of the fourth hydraulic port 1280*d* to which the first inspection flow path 1910 to be describe below is connected.

A third sealing member 1290*c* for blocking the flow of the pressure medium introduced into the first master chamber 1220*a* from the second inspection flow path 1920 connected to the third hydraulic port 1280*c* may be provided between the outer circumferential surface of the first master piston 1220 and the cylinder body 1210. The third sealing member 1290*c* may be seated in each of a pair of accommodating grooves formed to be recessed in each of the front and rear of the third hydraulic port 1280*c* of the inner circumferential surface of the cylinder body 1210 and may be in contact with the outer circumferential surface of the first master piston 1220. The pair of third sealing members 1290*c* may be provided in front of (left based on FIG. 1) the first sealing member 1290*a*, and may allow the flow of the pressure medium accommodated in the first master chamber 1220*a* transmitted to the second inspection flow path 1920 through the third hydraulic port 1280*c* and block the flow of the pressure medium introduced into the first master chamber 1220*a* from the second inspection flow path 1920.

The second master chamber 1230*a* may be formed inside the small-diameter portion 1212, which is an inner or front side (left based on FIG. 1) of the cylinder body 1210, and the second master piston 1230 may be accommodated to be reciprocated in the second master chamber 1230*a*.

The pressure medium may be introduced into and discharged from the second master chamber 1230*a* through a fifth hydraulic port 1280*e* and a sixth hydraulic port 1280*f*. The fifth hydraulic port 1280*e* may be connected to a second reservoir flow path 1720 to be described below so that the pressure medium accommodated in the reservoir 1100 may be introduced into the second master chamber 1230*a*. In addition, the sixth hydraulic port 1280*f* may be connected to the second backup flow path 1620 to be described below, and may allow the pressure medium accommodated in the second master chamber 1230*a* to be discharged toward the second backup flow path 1620 and conversely allow the pressure medium to be introduced into the second master chamber 1230*a* from the second backup flow path 1620.

The second master piston 1230 may be provided to be accommodated in the second master chamber 1230*a*, and may advance to generate a hydraulic pressure of the pressure medium accommodated in the second master chamber 1230*a* and retreat to generate a negative pressure in the second master chamber 1230*a*. The second master piston 1230 may include a second body 1231 formed in a cylindrical shape to be in close contact with an inner circumferential surface of the second master chamber 1230*a* and a second flange 1232 disposed to extend from a rear end (right end based on FIG. 1) of the second body 1231 in a radial direction and disposed inside the first master chamber 1220a. The second flange 1232 may be formed to have a larger diameter than the inner circumferential surface of the second master chamber 1230a. The second master piston 1230 may be elastically supported by a second piston spring 1230b, and the second piston spring 1230b may be provided to have one end supported by a front surface (left surface based on FIG. 1) of the second body 1231 and the other end supported by an inner surface of the cylinder body 1210.

A second sealing member 1290b for sealing the first master chamber 1220a with respect to the second master chamber 1230a may be provided between an outer circumferential surface of the second master piston 1230 and the cylinder body 1210. The second sealing member 1290b may be seated in an accommodating groove formed to be recessed on the inner circumferential surface of the cylinder body 1210 and provided to be in contact with the outer circumferential surface of the second master piston 1230, and may prevent the pressure medium accommodated in the first master chamber 1220a from leaking to the second master chamber 1230a by the second sealing member 1290b.

The second master piston 1230 is provided with a second cutoff hole 1230d communicating with the second master chamber 1230a and at the same time, communicating with the fifth hydraulic port 1280e and the second reservoir flow path 1720 in a non-operating state, that is, a preparation state before the displacement occurs. In addition, a fourth sealing member 1290d for blocking the flow of the press medium discharged from the second master chamber 1230a to the second reservoir flow path 1720 connected to the fifth hydraulic port 1280e may be provided between the outer circumferential surface of the second master piston 1230 and the cylinder body 1210. The fourth sealing member 1290d may be seated in an accommodating groove formed to be recessed in front of (left based on FIG. 1) the fifth hydraulic port 1280e of the inner circumferential surface of the cylinder body 1210 and may be in contact with the outer circumferential surface of the second master piston 1230. The fourth sealing member 1290d may be provided in front of (left based on FIG. 1) the second sealing member 1290b, and may allow the flow of the pressure medium transmitted from the second reservoir flow path 1720 connected to the fifth hydraulic port 1280e to the second master chamber 1230a and block the flow of the pressure medium transmitted from the second master chamber 1230a to the fifth hydraulic port 1280e and the second reservoir flow path 1720.

The integrated master cylinder 1200 may independently have the first master chamber 1220a and the second master chamber 1230a, thereby securing safety when components fail. For example, the first master chamber 1220a may be connected to any two wheel cylinders 21 and 22 through the first backup flow path 1610 to be described below, and the second master chamber 1230a may be connected to the other two wheel cylinders 23 and 24 through the second backup flow path 1620 to be described below, and thus the vehicle may be braked even when a problem such as a leak occurs in any one chamber.

The pedal simulator 1240 may be provided between the first master piston 1220 and the second master piston 1230 and may provide the pedal feeling of the brake pedal 10 to the driver by its own elastic restoring force. Specifically, the pedal simulator 1240 may be interposed between a front surface of the first master piston 1220 and a rear surface of the second master piston 1230 and made of an elastic material, such as compressible and expandable rubber. The pedal simulator 1240 may include a cylindrical body portion whose at least a portion is inserted into and supported by the front surface of the first master piston 1220 and a tapered portion whose at least a portion is inserted into and supported by the rear surface of the second master piston 1230 and having a gradually reduced diameter forward (left based on FIG. 1). At least a portion of each of both ends of the pedal simulator 1240 may be inserted into the first master piston 1220 and thus may be stably supported by the first master piston 1220. Furthermore, a stable and familiar pedal feeling can be provided to the driver by changing the elastic restoring force according to a degree of the pedal force of the brake pedal 10 by the tapered portion.

A simulator valve 1711 may be provided in the first reservoir flow path 1710 to be described below to control the flow of the pressure medium between the reservoir 1100 and the first master chamber 1220a. The simulator valve 1711 may be provided as a normally closed type solenoid valve that is normally closed and then operates so that the valve is opened when receiving an electrical signal from the ECU, and may be opened in a normal operation mode of the electronic brake system 1000.

Describing a pedal simulation operation by the integrated master cylinder 1200, the driver operates the brake pedal 10 in the normal operation mode, and at the same time, a first cut valve 1611 and a second cut valve 1621 respectively provided on the first backup flow path 1610 and the second backup flow path 1620, which will be described below, are closed, while the simulator valve 1711 of the first reservoir flow path 1710 is opened. As the brake pedal 10 is operated, the first master piston 1220 advances, but as the second cut valve 1621 is closed, the second master chamber 1230a is sealed, and the displacement of the second master piston 1230 may not occur. At this time, the pressure medium accommodated in the first master chamber 1220a is introduced along the first reservoir flow path 1710 by the closing operation of the first cut valve 1611 and the opening operation of the simulator valve 1711. While the second master piston 1230 does not advance, the first master piston 1220 may compress the pedal simulator 1240 as it continues to advance, and the elastic restoring force of the pedal simulator 1240 may be provided to the driver as the pedal feeling. Thereafter, when the driver releases the pedal force of the brake pedal 10, the first and second master pistons 1220 and 1230 and the pedal simulator 1240 return to original shapes and positions by the elastic restoring forces of the first and second piston springs 1220b and 1230b and the pedal simulator 1240, and the first master chamber 1220a may be filled with the pressure medium supplied from the reservoir 1100 through the first reservoir flow path 1710.

As described above, since the insides of the first master chamber 1220a and the second master chamber 1230a are always in a state of being filled with the pressure medium, it is possible to minimize friction between the first master piston 1220 and the second master piston 1230 upon the pedal simulation operation, thereby not only improving the durability of the integrated master cylinder 1200 but also blocking the introduction of foreign substances from the outside.

The reservoir 1100 may accommodate and store the pressure medium therein. The reservoir 1100 may be connected to each of the components, such as the integrated master cylinder 1200, the hydraulic pressure supply device 1300 to be described below, and the hydraulic circuit to be described below to supply or receive the pressure medium. In the drawings, several reservoirs 1100 are shown with the same reference numerals, but this is one example for helping the understanding of the invention, and the reservoir 1100 may be provided as a single component or as a plurality of separately independent components.

The reservoir flow path 1700 is provided to connect the integrated master cylinder 1200 and the reservoir 1100.

The reservoir flow path 1700 may include the first reservoir flow path 1710 connecting the first master chamber 1220a and the reservoir 1100 and the second reservoir flow path 1720 connecting the second master chamber 1230a and the reservoir 1100. To this end, the first reservoir flow path 1710 may have one end communicating with the first master chamber 1220a by the first hydraulic port 1280a of the integrated master cylinder 1200 and the other end communicating with the reservoir 1100, and the second reservoir flow path 1720 may have one end communicating with the second master chamber 1230a by the fifth hydraulic port 1280e of the integrated master cylinder 1200 and the other end communicating with the reservoir 1100. In addition, as described above, the first reservoir flow path 1710 may be provided with the simulator valve 1711 opened in the normal operation mode and may control the flow of the pressure medium between the reservoir 1100 and the first master chamber 1220a through the first reservoir flow path 1710.

The hydraulic pressure supply device 1300 is provided to receive the driver's braking intention as the electrical signal from the pedal displacement sensor for detecting the displacement of the brake pedal 10 and generate the hydraulic pressure of the pressure medium through the mechanical operation.

The hydraulic pressure supply device 1300 may include a hydraulic pressure provision unit for providing a pressure of the pressure medium transmitted to the wheel cylinder 20, a motor (not shown) for generating a rotational force by the electrical signal of the pedal displacement sensor, and a power converter (not shown) for converting a rotational motion of the motor into a linear motion and transmitting the linear motion to the hydraulic pressure supply unit.

The hydraulic pressure provision unit includes a cylinder block 1310 provided to accommodate the pressure medium, a hydraulic piston 1320 accommodated in the cylinder block 1310, a single pressure chamber 1330 having a variable volume by the operation of the hydraulic piston 1320, and a driving shaft 1390 for transmitting the power output from the power converter to the hydraulic piston 1320.

The single pressure chamber 1330 may be provided on a front side of the hydraulic piston 1320 (leftward from the hydraulic piston 1320 based on FIG. 1). In other words, the pressure chamber 1330 may be provided to be partitioned by the cylinder block 1310 and the front surface of the hydraulic piston 1320 and provided to have the variable volume due to the advance and retreat of the hydraulic piston 1320. The pressure chamber 1330 is connected to a first hydraulic pressure flow path 1401 to be described below through a communication hole formed in the cylinder block 1310.

A sealing member may be provided between the hydraulic piston 1320 and the cylinder block 1310 to seal the openings of the pressure chamber 1330 and the cylinder block 1310, and thus the hydraulic pressure or negative pressure of the pressure chamber 1330 generated by the advance or retreat of the hydraulic piston 1320 may be transmitted to the hydraulic pressure control unit 1400 and the hydraulic dump device 1800, which will be described below, without leaking to the outside.

The motor (not shown) is provided to generate a driving force of the hydraulic piston 1320 by the electrical signal output from the ECU. The motor may be provided to include a stator and a rotor, and thus may rotate in a forward or reverse direction through the stator to provide power for causing the displacement of the hydraulic piston 1320. A rotational angular velocity and a rotational angle of the motor may be precisely controlled by a motor control sensor. Since the motor is a well-known technology, a detailed description thereof will be omitted.

The power converter (not shown) is provided to convert the rotational force of the motor into a linear motion. The power converter may be provided in a structure including, for example, a worm shaft (not shown), a worm wheel (not shown), and the driving shaft 1390.

The worm shaft may be integrally formed with a rotational shaft of the motor, and a worm may be formed on an outer circumferential surface of the worm shaft and coupled to be engaged with the worm wheel to rotate the worm wheel. The worm wheel may be connected to be engaged with the driving shaft 1390 to linearly move the driving shaft 1390, and the driving shaft 1390 may be connected to the hydraulic piston 1320 to operate integrally, and thus the hydraulic piston 1320 may be slid in the cylinder block 1310.

Describing the above operations again, when the displacement of the brake pedal 10 is detected by the pedal displacement sensor, a detected signal is transmitted to the ECU, and the ECU drives the motor to rotate the worm shaft in one direction. The rotational force of the worm shaft may be transmitted to the driving shaft 1390 via the worm wheel, and the hydraulic piston 1320 connected to the driving shaft 1390 may advance in the cylinder block 1310 to generate the hydraulic pressure in the pressure chamber 1330.

Conversely, when the pedal force of the brake pedal 10 is released, the ECU drives the motor to rotate the worm shaft in an opposite direction. Therefore, the worm wheel may also rotate in the opposite direction, and the hydraulic piston 1320 connected to the driving shaft 1390 may retreat in the cylinder block 1310 to generate the negative pressure in the pressure chamber 1330.

Meanwhile, the power converter according to the embodiment is not limited to any one structure as long as it may convert the rotational motion of the motor into the linear motion of the hydraulic piston 1320, and it should be understood in the same manner even when the power converter is composed of various structures and types of devices.

The hydraulic pressure supply device 1300 may be hydraulically connected to the reservoir 1100 by the hydraulic dump device 1800. The hydraulic dump device 1800 may include a dump flow path 1810 connecting the pressure chamber 1330 and the reservoir 1100 and a dump check valve 1811 provided on the dump flow path 1810 to control the flow of the pressure medium. The dump check valve 1811 may be provided to allow only the flow of the pressure medium from the reservoir 1100 toward the pressure chamber 1330 and block the flow of the pressure medium in the opposite direction. Therefore, it is possible to prevent the hydraulic pressure of the pressure medium generated in the pressure chamber 1330 by the advance of the hydraulic piston 1320 from leaking to the reservoir 1100 via the dump flow path 1810 and conversely, quickly introduce the pressure medium into the pressure chamber 1330 via the dump flow path 1810 from the reservoir 1100 when the negative pressure is generated in the pressure chamber 1330 by the retreat of the hydraulic piston 1320.

The hydraulic pressure control unit 1400 may be provided to control the hydraulic pressure transmitted to each wheel cylinder 20, and the ECU may be provided to control the hydraulic pressure supply device 1300 and various valves on the basis of hydraulic pressure information and pedal displacement information.

The hydraulic pressure control unit 1400 may include a first hydraulic circuit 1510 for controlling the flow of the hydraulic pressure transmitted to first and second wheel cylinders 21 and 22 among four wheel cylinders 20 and a second hydraulic circuit 1520 for controlling the flow of the hydraulic pressure transmitted to third and fourth wheel cylinders 23 and 24, and includes a plurality of flow paths and valves to control the hydraulic pressure transmitted from the hydraulic pressure supply device 1300 to the wheel cylinder 20.

The first hydraulic pressure flow path 1401 may be provided to communicate with the pressure chamber 1330, and a second hydraulic pressure flow path 1402 and a third hydraulic pressure flow path 1403 may be branched from the first hydraulic pressure flow path 1401 and respectively connected to the first hydraulic circuit 1510 and the second hydraulic circuit 1520. In addition, a fourth hydraulic pressure flow path 1404 is provided to communicate with the first hydraulic circuit 1510, and a fifth hydraulic pressure flow path 1405 is provided to communicate with the second hydraulic circuit 1520. The fourth hydraulic pressure flow path 1404 and the fifth hydraulic pressure flow path 1405 may be joined to a sixth hydraulic pressure flow path 1406 to communicate with the pressure chamber 1330.

A first valve 1431 for controlling the flow of the pressure medium may be provided on the second hydraulic pressure flow path 1402. The first valve 1431 may be provided as a check valve for allowing the flow of the pressure medium discharged from the pressure chamber 1330 toward the first hydraulic circuit 1510 and blocking the flow of the pressure medium in an opposite direction. In addition, a second valve 1432 for controlling the flow of the pressure medium may be provided on the third hydraulic pressure flow path 1403, and the second valve 1432 may be provided as a check valve for allowing the flow of the pressure medium discharged from the pressure chamber 1330 toward the second hydraulic circuit 1520 and blocking the flow of the pressure medium in an opposite direction.

The fourth hydraulic pressure flow path 1404 is provided to communicate with the first hydraulic circuit 1510, and the fifth hydraulic pressure flow path 1405 is provided to communicate with the second hydraulic circuit 1520 and to be joined to the sixth hydraulic pressure flow path 1406. A third valve 1433 for controlling the flow of the pressure medium may be provided on the fourth hydraulic pressure flow path 1404. The third valve 1433 may be provided as a check valve for allowing only the flow of the pressure medium discharged from the first hydraulic circuit 1510 and blocking the flow of the pressure medium in the opposite direction. In addition, a fourth valve 1434 for controlling the flow of the pressure medium may be provided on the fifth hydraulic pressure flow path 1405. The fourth valve 1434 may be provided as a check valve for allowing only the flow of the pressure medium discharged from the second hydraulic circuit 1520 and blocking the flow of the pressure medium in the opposite direction.

The sixth hydraulic pressure flow path 1406 is provided to have one end where the fourth hydraulic pressure flow path 1404 and the fifth hydraulic pressure flow path 1405 join and the other end connected to the pressure chamber 1330. FIG. 1 shows that the other end of the sixth hydraulic pressure flow path 1406 is connected to the pressure chamber 1330 via the first hydraulic pressure flow path 1401, but it may also be understood in the same manner even when the other end of the sixth hydraulic pressure flow path 1406 is directly connected to the pressure chamber 1330. A fifth valve 1435 for controlling the flow of the pressure medium may be provided on the sixth hydraulic pressure flow path 1406. The fifth valve 1435 may be provided as a two-way control valve for controlling the flow of the pressure medium transmitted along the sixth hydraulic pressure flow path 1406. The fifth valve 1435 may be provided as a normally closed type solenoid valve that is normally closed and then operates so that the valve is opened when receiving the electrical signal from the ECU.

The hydraulic pressure control unit 1400 may transmit the hydraulic pressure generated in the pressure chamber 1330 due to the advance of the hydraulic piston 1320 to the first hydraulic circuit 1510 sequentially via the first hydraulic pressure flow path 1401 and the second hydraulic pressure flow path 1402, and transmit the hydraulic pressure to the second hydraulic circuit 1520 sequentially via the first hydraulic pressure flow path 1401 and the third hydraulic pressure flow path 1403 by the arrangement of the valves and the hydraulic pressure flow paths. Conversely, the negative pressure generated in the pressure chamber 1330 due to the retreat of the hydraulic piston 1320 may recover the pressure medium provided to the first hydraulic circuit 1510 to the pressure chamber 1330 sequentially via the fourth hydraulic pressure flow path 1404 and the sixth hydraulic pressure flow path 1406, and recover the pressure medium provided to the second hydraulic circuit 1520 to the pressure chamber 1330 sequentially via the fifth hydraulic pressure flow path 1405 and the sixth hydraulic pressure flow path 1406.

The first hydraulic circuit 1510 of the hydraulic pressure control unit 1400 may control the hydraulic pressures of the first and second wheel cylinders 21 and 22, which are two wheel cylinders among four vehicle wheels RR, RL, FR, and FL, and the second hydraulic circuit 1520 may control the hydraulic pressures of the third and fourth wheel cylinders 23 and 24, which are the other two wheel cylinders 20.

The first hydraulic circuit 1510 may receive the hydraulic pressure through the second hydraulic pressure flow path 1402 and discharge the hydraulic pressure through the fourth hydraulic pressure flow path 1404. To this end, as shown in FIG. 1, the first hydraulic circuit 1510 may be provided so that the second hydraulic pressure flow path 1402 and the fourth hydraulic pressure flow path 1404 are joined and then branched to two flow paths connected to the first wheel cylinder 21 and the second wheel cylinder 22. In addition, the second hydraulic circuit 1520 may receive the hydraulic pressure through the third hydraulic pressure flow path 1403 and discharge the hydraulic pressure through the fifth hydraulic pressure flow path 1405, and thus as shown in FIG. 1, may be provided so that the third hydraulic pressure flow path 1403 and the fifth hydraulic pressure flow path 1405 are joined and then branched to two flow paths connected to the third wheel cylinder 23 and the fourth wheel cylinder 24. However, the connection of the hydraulic pressure flow paths shown in FIG. 1 is one example for helping the understanding of the present invention and is not limited to the above structure, and it should be understood in the same manner even in case of the connection in various methods and structures, such as a case in which each of the second hydraulic pressure flow path 1402 and the fourth hydraulic pressure flow path 1404 is connected to the first hydraulic circuit 1510 and independently branched and connected to the first wheel cylinder 21 and the second wheel cylinder 22, and likewise, a case in which each of the third hydraulic pressure flow path 1403 and the fifth hydraulic pressure flow path 1405 is connected to the second hydraulic circuit 1520 and independently branched and connected to the third wheel cylinder 23 and the fourth wheel cylinder 24.

Each of the first and second hydraulic circuits 1510 and 1520 may have first to fourth inlet valves 1511*a*, 1511*b*, 1521*a*, and 1521*b* to control the flow and hydraulic pressure of the pressure medium transmitted to the first to fourth wheel cylinders 24. The first to fourth inlet valves 1511*a*, 1511*b*, 1521*a*, and 1521*b* may be respectively disposed on upstream sides of the first to fourth wheel cylinders 21, 22, 23, and 24 and provided as a normally open type solenoid valve that is normally open and operates so that the valve is closed when receiving the electrical signal from the ECU.

The first and second hydraulic circuits 1510 and 1520 may include first to fourth check valves 1513*a*, 1513*b*, 1523*a*, and 1523*b* provided to be connected in parallel to the first to fourth inlet valves 1511*a*, 1511*b*, 1521*a*, and 1521*b*. The check valves 1513*a*, 1513*b*, 1523*a*, and 1523*b* may be provided on bypass flow paths connecting the fronts and rears of the first to fourth inlet valves 1511*a*, 1511*b*, 1521*a*, and 1521*b* in the first and second hydraulic circuits 1510 and 1520, and may allow only the flow of the pressure medium discharged from each wheel cylinder 20 and block the flow of the pressure medium transmitted to the wheel cylinder 20. The first to fourth check valves 1513*a*, 1513*b*, 1523*a*, and 1523*b* may quickly discharge the hydraulic pressure of the pressure medium applied to each wheel cylinder 20, and the hydraulic pressure of the pressure medium applied to the wheel cylinder 20 may smoothly return toward the hydraulic pressure supply device 1300 even when the first to fourth inlet valves 1511*a*, 1511*b*, 1521*a*, and 1521*b* are not normally operated.

The second hydraulic circuit 1520 may include first and second outlet valves 1522*a* and 1522*b* for controlling the flow of the pressure medium discharged from the third and fourth wheel cylinders 23 and 24 in order to improve performance when the braking of the third and fourth wheel cylinders 23 and 24 is released. The first and second outlet valves 1522*a* and 1522*b* may be respectively provided on discharge sides of the third and fourth wheel cylinders 23 and 24 to control the flow of the pressure medium transmitted from the third and fourth wheel cylinders 23 and 24 to the reservoir 1100. The first and second outlet valves 1522*a* and 1522*b* may be provided as a normally closed type solenoid valve that is normally closed and then operates so that the valve is opened when receiving the electrical signal from the ECU.

The opening operations of the first and second outlet valves 1522*a* and 1522*b* may be selectively controlled to individually reduce the hydraulic pressure of the pressure medium applied to the third wheel cylinder 23 and the fourth wheel cylinder 24 when an active braking such as an anti-lock brake system (ABS) mode or a traction control system (TCS) mode of the vehicle is performed. In other words, the hydraulic pressure of the pressure medium applied to the third wheel cylinder 23 of the second hydraulic circuit 1520 upon the active braking may be discharged to the reservoir 1100 by opening the first outlet valve 1522*a* to form a discharge flow path of the third wheel cylinder 23, and the hydraulic pressure of the pressure medium applied to the fourth wheel cylinder 24 of the second hydraulic circuit 1520 may be discharged to the reservoir 1100 by opening the second outlet valve 1522*b* to form a discharge flow path of the fourth wheel cylinder 24.

The first and second wheel cylinders 21 and 22 of the first hydraulic circuit 1510 may be connected by branching the first backup flow path 1610 to be described below. Therefore, the hydraulic pressure of the pressure medium applied to the first and second wheel cylinders 21 and 22 upon the active braking may be individually reduced, and specifically, the pressure medium applied to the first and second wheel cylinders 21 and 22 may be discharged to the reservoir 1100 sequentially via the first backup flow path 1610, the first master chamber 1220*a*, and the first reservoir flow path 1710 to form discharge flow paths of the first and second wheel cylinders 21 and 22.

The electronic brake system 1000 according to the first embodiment of the present invention may include the first and second backup flow paths 1610 and 1620 capable of implementing braking by directly supplying the pressure medium discharged from the integrated master cylinder 1200 to the wheel cylinder 20 when the normal operation is not available by a failure of the device or the like. A mode in which the hydraulic pressure of the integrated master cylinder 1200 is directly transmitted to the wheel cylinder 20 is referred to as an abnormal operation mode, that is, a fall-back mode.

The first backup flow path 1610 may be provided to connect the first master chamber 1220*a* of the integrated master cylinder 1200 and the first hydraulic circuit 1510, and the second backup flow path 1620 may be provided to connect the second master chamber 1230*a* of the integrated master cylinder 1200 and the second hydraulic circuit 1520.

The first backup flow path 1610 may have one end connected to the first master chamber 1220*a* and the other end branched and connected to downstream sides of the first and second inlet valves 1511*a* and 1511*b* in the first hydraulic circuit 1510, and the second backup flow path 1620 may have one end connected to the second master chamber 1230*a* and the other end connected between the fourth inlet valve 1521*b* and the second outlet valve 1522*b* in the second hydraulic circuit 1520. FIG. 1 shows that the second backup flow path 1620 is connected between the fourth inlet valve 1521*b* and the second outlet valve 1522*b*, but it should be understood in the same manner when the second backup flow path 1620 is branched and connected to at least any one of the upstream sides of the first outlet valve 1522*a* and the second outlet valve 1522*b*.

At least one first cut valve 1611 for controlling the flow of the pressure medium in both directions may be provided on the first backup flow path 1610. Specifically, the other end of the first backup flow path 1610 may be branched and connected to each of the downstream sides of the first and second inlet valves 1511*a* and 1511*b*, and the first cut valve 1611 may be divided into a first dump valve 1611*a* for controlling the flow of the pressure medium between the first wheel cylinder 21 and the first backup flow path 1610 and a second dump valve 1611*b* for controlling the flow of the pressure medium between the second wheel cylinder 22 and the first backup flow path 1610.

Among them, the second dump valve 1611*b* may be provided as a normally closed type solenoid valve that is normally closed and then operates so that the valve is opened when receiving the electrical signal from the ECU. Therefore, the second dump valve 1611*b* may maintain a closed state in the normal operation mode of the electronic brake system 1000 and may be opened to individually reduce the hydraulic pressure of the pressure medium applied to the second wheel cylinder 22 when the active braking, such as an ABS mode or a TCS mode, of the vehicle is performed.

Meanwhile, the first dump valve may be provided as a normally open type solenoid valve that is normally open and then operates so that the valve is closed when receiving the closing signal from the ECU.

The second cut valve 1621 for controlling the flow of the pressure medium in both directions may be provided on the second backup flow path 1620. The second cut valve 1621 may be provided as a normally open type solenoid valve that is normally open and then operates so that the valve is closed when receiving the closing signal from the ECU.

As shown in FIG. 1, the pair of first and second dump valves 1611*a* and 1611*b* may be respectively provided on the first and second wheel cylinders 21 and 22, and may selectively release the hydraulic pressure of the pressure medium applied to the first wheel cylinder 21 and the second wheel cylinder 22 upon the active braking, such as an ABS braking mode of the vehicle and discharge the hydraulic pressure of the pressure medium toward the reservoir 1100 sequentially via the first backup flow path 1610, the first master chamber 1220*a*, and the first reservoir flow path 1710.

When the first and second cut valves 1611 and 1621 are closed, it is possible to prevent the pressure medium of the integrated master cylinder 1200 from being directly transmitted to the wheel cylinder 20 and at the same time, prevent the hydraulic pressure provided from the hydraulic pressure supply device 1300 from leaking to the integrated master cylinder 1200. In addition, when the first and second cut valves 1611 and 1621 are opened, the pressure medium pressed from the integrated master cylinder 1200 may be directly supplied to the first and second hydraulic circuits 1510 and 1520 through the first and second backup flow paths 1610 and 1620, thereby implementing braking.

The inspection flow path 1900 is provided to connect the integrated master cylinder 1200 and the hydraulic pressure supply device 1300 and provided to inspect whether there is a leakage in various components mounted on the integrated master cylinder 1200 and the simulator valve 1711.

The inspection flow path 1900 may include the first inspection flow path 1910 having one end connected to the first master chamber 1220*a* through the fourth hydraulic port 1280*d* and the other end connected between the second cut valve 1621 and the second hydraulic circuit 1520 on the second backup flow path 1620, and the second inspection flow path 1920 having one end connected to the first master chamber 1220*a* through the third hydraulic port 1280*c* and the other end connected to the pressure chamber 1330. The other end of the second inspection flow path 1920 may be directly connected to the pressure chamber 1330 or may also be connected to the pressure chamber 1330 via the hydraulic dump device 1800 as shown in FIG. 1.

An inspection check valve 1911 for allowing only the flow of the pressure medium from the first master chamber 1220*a* toward the second backup flow path 1620 and blocking the flow of the pressure medium in an opposite direction may be provided on the first inspection flow path 1910. In addition, an inspection control valve 1921 for controlling the flow of the pressure medium in both directions between the first master chamber 1220*a* and the pressure chamber 1330 may be provided on the second inspection flow path 1920, and the inspection control valve 1921 may be provided as a normally closed type solenoid valve that is normally closed and then operates so that the valve is opened when receiving the electrical signal from the ECU. A detailed description thereof will be described below.

The electronic brake system 1000 may include a circuit pressure sensor PS1 for detecting the hydraulic pressure of the pressure medium provided by the hydraulic pressure supply device 1300 and a cylinder pressure sensor PS2 for detecting the hydraulic pressure of the second master chamber 1230*a*. The circuit pressure sensor PS1 may be provided on the first hydraulic circuit 1510 side to detect the hydraulic pressure of the pressure medium generated and provided from the hydraulic pressure supply device 1300 in an inspection mode and then transmitted to the first hydraulic circuit 1510, and the cylinder pressure sensor PS2 may be provided between the second master chamber 1230*a* and the second cut valve 1621 on the second backup flow path 1620 to detect the hydraulic pressure of the pressure medium accommodated in the second master chamber 1230*a*. In a first inspection mode to be described below, pressure value information of the pressure medium detected by the circuit pressure sensor PS1 and the cylinder pressure sensor PS2 may be sent to the ECU, and the ECU may compare a hydraulic pressure vale detected from the circuit pressure sensor PS1 and a hydraulic pressure value detected from the cylinder pressure sensor PS2 and determine whether there is a leakage in the integrated master cylinder 1200 or the simulator valve 1711. In addition, the electronic brake system 1000 may include a stroke sensor (not shown) for measuring a displacement amount of the hydraulic piston 1320 of the hydraulic pressure supply device 1300, and the stroke sensor may inspect whether there is a leakage in the integrated master cylinder 1200 on the basis of the displacement amount information of the hydraulic piston 1320 in a second inspection mode to be described below. A detailed description thereof will be described below with reference to FIGS. 3 and 4.

Hereinafter, an operation method of the electronic brake system 1000 according to the first embodiment of the present invention will be described.

The electronic brake system 1000 according to the first embodiment of the present invention may include a normal operation mode in which the electronic brake system 1000 is operated normally to perform braking without failure or abnormality of various components, an inspection mode in which whether there is a leakage in the integrated master cylinder 1200 and the simulator valve 1711 is inspected, and an abnormal operation mode (fall-back mode) in which the braking of the vehicle is urgently performed in a state in which the brake system fails or is abnormal.

First, the normal operation mode of the electronic brake system 1000 according to the first embodiment of the present invention will be described.

FIG. 2 is a hydraulic circuit diagram showing a state in which the electronic brake system 1000 according to the first embodiment of the present invention performs braking in the normal operation mode.

Referring to FIG. 2, when the driver steps on the brake pedal 10 to brake the vehicle, the motor (not shown) operates to rotate in one direction, the rotational force of the motor is transmitted to the hydraulic pressure provision unit by the power converter, and the hydraulic piston 1320 of the hydraulic pressure provision unit advances and generates the hydraulic pressure in the pressure chamber 1330. The hydraulic pressure discharged from the pressure chamber 1330 is transmitted to each wheel cylinder 20 via the hydraulic pressure control unit 1400, the first hydraulic circuit 1510, and the second hydraulic circuit 1520 to generate the braking force.

Specifically, the hydraulic pressure generated in the pressure chamber 1330 may sequentially flow along the first hydraulic pressure flow path 1401 and the second hydraulic pressure flow path 1402 and may be transmitted to the first and second wheel cylinders 21 and 22 provided in the first hydraulic circuit 1510 to perform braking. At this time, since the first valve 1431 provided on the second hydraulic pressure flow path 1402 may allow only the flow of the pressure medium discharged from the pressure chamber 1330, the hydraulic pressure of the pressure medium may be smoothly transmitted to the first and second wheel cylinders 21 and 22. The first inlet valve 1511a and the second inlet valve 1511b provided in the first hydraulic circuit 1510 may maintain an open state, and the first cut valve 1611 may maintain a closed state, thereby preventing the hydraulic pressure of the pressure medium from leaking to the first backup flow path 1610.

In addition, the hydraulic pressure of the pressure medium formed in the pressure chamber 1330 may sequentially flow along the first hydraulic pressure flow path 1401 and the third hydraulic pressure flow path 1403 and may be transmitted to the third and fourth wheel cylinders 23 and 24 provided in the second hydraulic circuit 1520 to perform braking. At this time, since the second valve 1432 provided on the third hydraulic pressure flow path 1403 allows only the flow of the pressure medium discharged from the pressure chamber 1330, the hydraulic pressure of the pressure medium may be smoothly transmitted to the third and fourth wheel cylinders 23 and 24. In addition, the third inlet valve 1521a and the fourth inlet valve 1521b provided in the second hydraulic circuit 1520 may maintain an open state, and the first outlet valve 1522a and the second outlet valve 1522b may maintain a closed state, thereby preventing the hydraulic pressure of the pressure medium from leaking to the reservoir 1100.

Meanwhile, in the normal braking mode, the fifth valve 1435 may be switched to an open state, and the first cut valve 1611 and the second cut valve 1621 respectively provided on the first backup flow path 1610 and the second backup flow path 1620 may be switched to a closed state, thereby preventing the hydraulic pressure of the pressure medium provided from the hydraulic pressure supply device 1300 from leaking to the integrated master cylinder 1200.

In addition, as the driver operates the brake pedal 10, the first cut valve 1611 and the second cut valve 1621 respectively provided on the first backup flow path 1610 and the second backup flow path 1620, which will be described below, are closed, while the simulator valve 1711 of the first reservoir flow path 1710 is opened. As the brake pedal 10 is operated, the first master piston 1220 advances, but as the second cut valve 1621 is closed, the second master chamber 1230a is sealed, and the displacement of the second master piston 1230 may not occur. At this time, the pressure medium accommodated in the first master chamber 1220a is introduced along the first reservoir flow path 1710 by the closing operation of the first cut valve 1611 and the opening operation of the simulator valve 1711. The second master piston 1230 does not advance, but the first master piston 1220 may compress the pedal simulator 1240 as it continues to advance, and the elastic restoring force of the pedal simulator 1240 may be provided to the driver as the pedal feeling.

Hereinafter, the inspection mode of the electronic brake system 1000 according to the first embodiment of the present invention will be described.

FIG. 3 is a hydraulic circuit diagram showing a state in which the electronic brake system according to the first embodiment of the present invention performs the first inspection mode. Referring to FIG. 3, the ECU operates the motor to advance the hydraulic piston 1320 and generate hydraulic pressure in the pressure chamber 1330. At the same time, the simulator valve 1711, the inspection control valve 1911, and the second cut valve 1621 are closed, and the dump valve 1611a of any one of the first and second inlet valves 1511a and 1511b and the first cut valve 1611 is opened. Therefore, the hydraulic pressure formed in the pressure chamber 1330 is introduced into the first master chamber 1220a sequentially via the hydraulic pressure control unit 1400, the first and second inlet valves 1511a and 1511b of the first hydraulic circuit 1510, and the first backup flow path 1610. At this time, since the second cut valve 1621 is in a closed state, the second master chamber 1230a is sealed.

In this state, the ECU may compare the pressure value measured by the circuit pressure sensor PS1 with the pressure value measured by the cylinder pressure sensor PS2 and inspect whether there is a leakage in the integrated master cylinder 1200 and the simulator valve 1711. Specifically, when there is no leakage in the components mounted on the integrated master cylinder 1200 and the simulator valve 1711, the hydraulic pressure value of the hydraulic pressure supply device 1300 measured by the circuit pressure sensor PS1 reaches a target pressure, and at the same time, the corresponding hydraulic pressure is introduced into the first master chamber 1220a via the first backup flow path 1610 to press the second master piston 1230 forward, and thus the hydraulic pressure value of the second master chamber 1230a detected by the cylinder pressure sensor PS2 and the hydraulic pressure value detected by the circuit pressure sensor PS1 may be synchronized with each other. When the hydraulic pressure value detected by the circuit pressure sensor PS1 and the hydraulic pressure value detected by the cylinder pressure sensor PS2 are synchronized for a certain time, the ECU may determine that the electronic brake system is in a normal state and terminate the first inspection mode.

On the other hand, when the hydraulic pressure measured by the cylinder pressure sensor PS2 is lower than the hydraulic pressure measured by the circuit pressure sensor PS1, it may be determined that there is a leakage in the integrated master cylinder 1200 and the simulator valve 1711. Specifically, the ECU maintains the corresponding hydraulic pressure for a certain time after the hydraulic pressure value of the pressure medium pressed by the hydraulic pressure supply device 1300 measured by the circuit pressure sensor PS1 reaches the target pressure, but when the hydraulic pressure value of the second master chamber 1230a detected by the cylinder pressure sensor PS2 is lower than the hydraulic pressure value detected by circuit pressure sensor PS1 or when the hydraulic pressure value detected by circuit pressure sensor PS1 is also gradually reduced, the hydraulic pressure of the second master chamber 1230a does not reach the target pressure because there is a leakage in the integrated master cylinder 1200 and the simulator valve 1711, and thus the ECU may determine that the electronic brake system is in an abnormal state.

As described above, the electronic brake system 1000 according to the first embodiment of the present invention may determine whether various components, specifically, the first sealing member 1290a, the second sealing member 1290b, the fourth sealing member 1290d, the first inspection check valve 1911, and the like, provided in the integrated master cylinder 1200 are normal through the first inspection mode and determine whether the simulator valve 1711 is normal together. Furthermore, the electronic braking system 1000 may also determine whether the peripheral components connected to the integrated master cylinder 1200, such as the second cut valve 1621, are normal together.

When the ECU determines that there is a leakage in the components of the integrated master cylinder 1200 or the simulator valve 1711 as a result of the first inspection mode, the ECU may notify the driver of the abnormal state through a display or a warning sound and guide the driver to limit the operation of the vehicle.

When the first inspection mode is determined to be normal as a result of performing the first inspection mode, the ECU may enter the second inspection mode.

FIG. 4 is a hydraulic circuit diagram showing a state in which the electronic brake system according to the first embodiment of the present invention performs a second inspection mode, and referring to FIG. 4, the ECU operates the motor to advance the hydraulic piston 1320 and generate the hydraulic pressure in the pressure chamber 1330. At the same time, the ECU may close the first and second inlet valves 1511a and 1511b and the second cut valve 1621 and open the inspection control valve 1921 to allow the hydraulic connection between the pressure chamber 1330 and the second inspection flow path 1920. Therefore, the hydraulic pressure generated in the pressure chamber 1330 is transmitted to the third hydraulic port 1280c via the second inspection flow path 1920. At this time, although not shown in the drawings, the third and fourth inlet valves 1521a and 1521b may also be switched to a closed state in order to quickly perform the inspection mode.

The third sealing member 1290c is provided to block the flow of the pressure medium from the second inspection flow path 1920 toward the first master chamber 1220a, and thus when the third sealing member 1290c corresponds to the normal state, as the third hydraulic port 1280c is sealed, it is difficult for the hydraulic piston 1320 to advance further after advancing by a certain displacement amount and thus a hydraulic pressure high than or equal to a certain level may not be formed in the pressure chamber 1330.

Therefore, when the amount of displacement of the hydraulic piston measured by the stroke sensor (not shown) falls within a certain range, the ECU may determine that the third sealing member 1290c is in a normal state and terminate the second inspection mode. On the other hand, when the amount of displacement of the hydraulic piston measured by the stroke sensor (not shown) exceeds the certain range or gradually increases, the ECU may determine that the third sealing member 1290c is in an abnormal state because there is a leakage in the third sealing member 1290c, notify the abnormal state of the driver through a display or a warning sound, and guide the driver to limit the operation of the vehicle.

Hereinafter, a case in which the electronic brake system 1000 according to the first embodiment of the present invention is not normally operated, that is, an operating state in a fall-back mode will be described.

FIG. 5 is a hydraulic circuit diagram showing an operating state in an abnormal operation mode (fall-back mode) when the electronic brake system 1000 according to the first embodiment of the present invention may not be normally operated by a failure of the device or the like.

Referring to FIG. 5, in the abnormal operation mode, each valve is controlled in an initial braking state that is a non-operating state. At this time, when the driver applies the pedal force to the brake pedal 10, the first master piston 1220 connected to the brake pedal 10 advances and a displacement occurs. Since the first dump valve 1611a of the first cut valves 1611 is provided in an open state in the non-operating state, the pressure medium accommodated in the first master chamber 1220a by the advance of the first master piston 1220 may be transmitted to the first wheel cylinder 21 and the second wheel cylinder 22 of the first hydraulic circuit 1510 along the first backup flow path 1610 to implement braking.

In addition, the second master piston 1230 also advances due to the advance of the first master piston 1220 and a displacement occurs, and the second cut valve 1621 is also provided in an open state in the non-operating state, and thus the pressure medium accommodated in the second master chamber 1230a may be transmitted to the third wheel cylinder 23 and the fourth wheel cylinder 24 of the second hydraulic circuit 1520 along the second backup flow path 1620 to implement braking.

Hereinafter, an electronic brake system 2000 according to a second embodiment of the present invention will be described.

FIG. 6 is a hydraulic circuit diagram showing the electronic brake system 2000 according to the second embodiment of the present invention, and referring to FIG. 6, the electronic brake system 2000 according to the second embodiment may perform cooperative control for a regenerative braking mode.

A description of the electronic brake system 2000 according to the second embodiment of the present invention is the same as the above description of the electronic brake system 1000 according to the first embodiment of the present invention except for a case in which separate reference numerals are additionally indicated and a further description is made, and thus the description thereof will be omitted to prevent the duplication of contents.

Recently, as the market demand for eco-friendly vehicles increases, hybrid vehicles with improved fuel efficiency are gaining popularity. The hybrid vehicles recover kinetic energy as electrical energy while the vehicle is braked, store the electrical energy in a battery, and then use the motor as an auxiliary driving source for the vehicle, and generally, the hybrid vehicles recover energy by a generator (not shown) or the like while the vehicle is braked in order to increase energy recovery. The braking operation is called a regenerative braking mode, and the electronic brake system 2000 according to the embodiment may assign the third wheel cylinder 23 and the fourth wheel cylinder 24 of the second hydraulic circuit 1520 to a rear left wheel RL and a rear right wheel RR in order to implement the regenerative braking mode, and the generators (not shown) may be provided thereto. The regenerative braking mode may be performed through the cooperative control of the generators of the third and fourth wheel cylinders 23 and 24 and a sixth valve 2436 to be described below.

A hydraulic pressure control unit 2400 of the electronic brake system 2000 according to the second embodiment of the present invention may further include the sixth valve 2436 for adjusting the hydraulic pressure of the pressure medium transmitted to the second hydraulic circuit 1520. The sixth valve 2436 may be disposed on an inlet end of the second hydraulic circuit 1520, for example, a rear end of the second valve 1432 on the third hydraulic pressure flow path 1403 and provided as a two-way control valve for controlling the flow of the pressure medium transmitted to the second hydraulic circuit 1520. The sixth valve 2436 may be provided as a normally open type solenoid valve that is normally open and then operates so that the valve is closed when receiving the electrical signal from the ECU. The sixth valve 2436 may be controlled to be opened in the normal operation mode of the electronic brake system 2000 and switched to a closed state when entering the regenerative braking mode by the generators (not shown) provided on the third wheel cylinder 23 and the fourth wheel cylinder 24.

Describing the regenerative braking mode of the electronic brake system 2000 according to the second embodiment of the present invention, in the first wheel cylinder 21 and the second wheel cylinder 22 of the first hydraulic circuit 1510 of front wheels, the braking force to be implemented by the driver is generated by the hydraulic pressure of the pressure medium by the operation of the hydraulic pressure supply device 1300, while in the third wheel cylinder 23 and the fourth wheel cylinder 24 of the second hydraulic circuit 1520 of rear wheels on which energy recovery devices, such as generators, are installed, the sum of the total braking pressure obtained by adding a braking pressure of the pressure medium by the hydraulic pressure supply device 1300 and a regenerative braking pressure by the generator needs to be equal to the total braking force of the first wheel cylinder 21 and the second wheel cylinder 22.

Therefore, when entering the regenerative braking mode, the braking pressures by the hydraulic pressure supply device 1300 applied to the third and fourth wheel cylinders 23 and 24 are removed or kept constant by closing the sixth valve 2436, and at the same time, the total braking force of the third and fourth wheel cylinders 23 and 24 may be equal to the braking forces of the first and second wheel cylinders 21 and 22 by increasing the regenerative braking pressure by the generators.

Specifically, when the driver steps on the brake pedal 10 upon braking of the vehicle, the motor operates to rotate in one direction, the rotational force of the motor is transmitted to the hydraulic pressure provision unit by a power transmission device, and the hydraulic piston 1320 of the hydraulic pressure provision unit advances and generates the hydraulic pressure in the pressure chamber 1330. The hydraulic pressure discharged from the pressure chamber 1330 is transmitted to each wheel cylinder 20 via the hydraulic pressure control unit 1400, the first hydraulic circuit 1510, and the second hydraulic circuit 1520 to generate the braking force.

In the first hydraulic circuit 1510 in which the energy recovery device, such as the generator, is not installed, the hydraulic pressure of the pressure medium generated in the pressure chamber 1330 sequentially flows along the first hydraulic pressure flow path 1401 and the second hydraulic pressure flow path 1402 to implement the braking of the first and second wheel cylinders 21 and 22. As described above, since the first valve 1431 allows the flow of the pressure medium from the pressure chamber 1330 toward the first hydraulic circuit 1510, the hydraulic pressure of the pressure medium generated in the pressure chamber 1330 may be transmitted to the first hydraulic circuit 1510.

On the other hand, in the second hydraulic circuit 1520 in which the generator is installed, the ECU may detect the speed, deceleration, and the like of the vehicle and close the sixth valve 2436 when it is determined that the entry into the regenerative braking mode is possible to block the hydraulic pressure of the pressure medium from being transmitted to the third wheel cylinder 23 and the fourth wheel cylinder 24, thereby implementing the regenerative braking by the generator. Thereafter, when the ECU determines that the vehicle is in an unsuitable state for regenerative braking or determines that the braking pressure of the first hydraulic circuit 1510 and the braking pressure of the second hydraulic circuit 1520 are different, the ECU may switch the sixth valve 2436 to an open state to control the hydraulic pressure of the pressure medium to be transmitted to the second hydraulic circuit 1520, and at the same time, synchronize the braking pressure of the first hydraulic circuit 1510 with the braking pressure of the second hydraulic circuit 1520.

Therefore, the braking pressures or braking forces applied to the first to fourth wheel cylinders 20 may be uniformly controlled, thereby realizing the braking stability of the vehicle and improving the travel stability of the vehicle by preventing oversteering or understeering.

Hereinafter, an electronic brake system 3000 according to a third embodiment of the present invention will be described.

FIG. 7 is a hydraulic circuit diagram showing the electronic brake system 3000 according to the third embodiment of the present invention, and referring to FIG. 7, the electronic brake system 3000 according to the third embodiment may further include a first circuit pressure sensor PS11 for detecting the hydraulic pressure of the pressure medium transmitted to the first hydraulic circuit 1510 and a second circuit pressure sensor PS12 for detecting the hydraulic pressure of the pressure medium transmitted to the second hydraulic circuit 1520.

A description of the electronic brake system 3000 according to the third embodiment of the present invention to be described below is the same as the above description of the electronic brake system 1000 according to the first embodiment of the present invention except for a case in which separate reference numerals are additionally indicated and a further description is made, and thus the description thereof will be omitted to prevent the duplication of contents.

The first circuit pressure sensor PS11 may detect the hydraulic pressure of the pressure medium, which is generated and provided from the hydraulic pressure supply device 1300 and transmitted to the first hydraulic circuit 1510, and send pressure value information to the ECU. In addition, the second circuit pressure sensor PS12 may detect the hydraulic pressure of the pressure medium generated and provided from the hydraulic pressure supply device 1300 and transmitted to the second hydraulic circuit 1520, and send pressure value information to the ECU. The ECU may receive the hydraulic pressure value information of each hydraulic circuit from the first and second circuit pressure sensors PS11 and PS12 and control the operation of the hydraulic pressure supply device 1300 on the basis of the hydraulic pressure value information, and thus assist the autonomous traveling of the vehicle, such as a highway traveling assistance for the vehicle or emergency braking.

For example, the first and second wheel cylinders 31 and 22 provided in the first hydraulic circuit 1510 may be respectively assigned to the front right wheel FR and the front left wheel FL, and the third and fourth wheel cylinders 33 and 24 provided in the second hydraulic circuit 1520 may be respectively assigned to the rear left wheel RL and the rear right wheel RR, and thus the first circuit pressure sensor PS11 may detect and send the hydraulic pressures applied to the wheel cylinders of the front wheels, and the second circuit pressure sensor PS12 may detect and send the hydraulic pressures applied to the wheel cylinders of the rear wheels. The ECU may automatically adjust and control the braking pressure of the vehicle on the basis of the hydraulic pressure information of the wheel cylinders of the front wheels and the rear wheels received from each of the first circuit pressure sensor PS11 and the second circuit pressure sensor PS21, thereby achieving the driver's traveling convenience.

As described above, although the present invention has been described by the limited embodiments and drawings, the present invention is not limited thereto, and it goes without saying that various modifications and changes are possible by those skilled in the art to which the present invention pertains within the technical spirit of the present invention and the equivalent scope of the appended claims.

The invention claimed is:

1. An electronic brake system comprising:

an integrated master cylinder including a master piston displaced by an operation of a brake pedal, a master chamber having a volume changed by a displacement of the master piston, a pedal simulator compressed by the displacement of the master piston and configured to provide a pedal feeling through an elastic restoring force generated by the compression, a first master piston connected to the brake pedal, a first master chamber having a volume changed by a displacement of the first master piston, a second master piston provided to be displaced by the displacement of the first master piston or a hydraulic pressure of the first master chamber, and a second master chamber having a volume changed by a displacement of the second master piston;

a hydraulic pressure supply device including a hydraulic piston operated by an electrical signal output in response to a displacement of the brake pedal and configured to generate a hydraulic pressure of a pressure medium and a single pressure chamber provided on one side of the hydraulic piston;

a hydraulic pressure control unit including a first hydraulic circuit configured to control a flow of a pressure medium supplied to a first wheel cylinder and a second wheel cylinder and a second hydraulic circuit configured to control a flow of a pressure medium supplied to a third wheel cylinder and a fourth wheel cylinder, and configured to control the flow of the pressure medium supplied to the first and second hydraulic circuits from the hydraulic pressure supply device;

an electronic control unit configured to control valves on the basis of hydraulic pressure information and displacement information of the brake pedal;

an inspection flow path communicating with the master chamber and connected to receive the hydraulic pressure from the hydraulic pressure supply device;

an inspection valve provided on the inspection flow path and configured to control the flow of the pressure medium;

a first backup flow path connecting the first master chamber and the first hydraulic circuit; and a second backup flow path connecting the second master chamber and the second hydraulic circuit, wherein the hydraulic pressure control unit includes a first hydraulic pressure flow path communicating with the pressure chamber, a second hydraulic pressure flow path branched from the first hydraulic pressure flow path and connected to the first hydraulic circuit, a third hydraulic pressure flow path branched from the first hydraulic pressure flow path and connected to the second hydraulic circuit, a fourth hydraulic pressure flow path communicating with the first hydraulic circuit, a fifth hydraulic pressure flow path communicating with the second hydraulic circuit, and a sixth hydraulic pressure flow path joined to the fourth hydraulic pressure flow path and the fifth hydraulic pressure flow path and communicating with the pressure chamber; and the master chamber comprises at least one hydraulic port for discharging a pressure medium from the master chamber toward at least one of the first wheel cylinder and the second wheel cylinder, wherein the inspection flow path includes a first inspection flow path having one end connected to the first master chamber and the other end connected to the second backup flow path, and the inspection valve includes an inspection check valve provided on the first inspection flow path and configured to allow only a flow of a pressure medium discharged from the first master chamber.

2. The electronic brake system of claim 1, wherein the hydraulic pressure control unit includes a first valve provided on the second hydraulic pressure flow path and configured to control the flow of the pressure medium, a second valve provided on the third hydraulic pressure flow path and configured to control the flow of the pressure medium, a third valve provided on the fourth hydraulic pressure flow path and configured to control the flow of the pressure medium, a fourth valve provided on the fifth hydraulic pressure flow path and configured to control the flow of the pressure medium, and a fifth valve provided on the sixth hydraulic pressure flow path and configured to control the flow of the pressure medium.

3. The electronic brake system of claim 2, wherein the first valve is provided as a check valve configured to allow only a flow of a pressure medium discharged from the pressure chamber, the second valve is provided as a check valve configured to allow only the flow of the pressure medium discharged from the pressure chamber, the third valve is provided as a check valve configured to allow only a flow of a pressure medium discharged from the first hydraulic circuit, the fourth valve is provided as a check valve configured to allow only a flow of a pressure medium discharged from the second hydraulic circuit, and the fifth valve is provided as a solenoid valve configured to control a bidirectional flow of the pressure medium.

4. The electronic brake system of claim 1, further comprising:

a circuit pressure sensor configured to detect a hydraulic pressure provided by the hydraulic pressure supply device; and a cylinder pressure sensor configured to detect a hydraulic pressure of the master chamber.

5. The electronic brake system of claim 4, wherein the cylinder pressure sensor detects a hydraulic pressure of the second master chamber.

6. The electronic brake system of claim 5, wherein the integrated master cylinder further includes a first sealing member configured to seal the first master chamber from the outside and a second sealing member configured to seal the first master chamber with respect to the second master chamber.

7. The electronic brake system of claim 6, further comprising:

a reservoir configured to store the pressure medium;

a first reservoir flow path connecting the reservoir and the first master chamber; and a simulator valve provided on the first reservoir flow path and configured to control a flow of a pressure medium between the reservoir and the first master chamber.

8. The electronic brake system of claim 5, further comprising:

at least one first cut valve provided on the first backup flow path and configured to control the flow of the pressure medium; and

US 12,691,859 B2

27 a second cut valve provided on the second backup flow path and configured to control the flow of the pressure medium.

9. The electronic brake system of claim 6, wherein the inspection flow path further includes a second inspection flow path having one end connected to the first master chamber and the other end connected to the pressure chamber, and the inspection valve further includes an inspection control valve provided on the second inspection flow path and configured to control a bidirectional flow of the pressure medium.

10. The electronic brake system of claim 9, wherein the integrated master cylinder further includes a third sealing member configured to block a flow of a pressure medium introduced into the first master chamber from the second inspection flow path, the first sealing member is provided behind the third sealing member, and the first inspection flow path is connected between the first sealing member and the third sealing member on the integrated master cylinder.

11. The electronic brake system of claim 6, further comprising:

a reservoir configured to store the pressure medium; and a second reservoir flow path connecting the reservoir and the second master chamber, wherein the integrated master cylinder further includes a fourth sealing member configured to block a flow of a pressure medium discharged from the second master chamber to the second reservoir flow path.

12. The electronic brake system of claim 8, wherein the first cut valve includes:

a first dump valve configured to control a flow of a pressure medium between the first wheel cylinder and the first backup flow path; and

28 a second dump valve configured to control a flow of a pressure medium between the second wheel cylinder and the first backup flow path.

13. An operation method of the electronic brake system of claim 7, comprising:

a first inspection mode in which whether there is a leakage in the integrated master cylinder or the simulator valve is inspected, wherein, in the first inspection mode, the hydraulic piston is operated to supply the hydraulic pressure generated in the pressure chamber to the first master chamber by the hydraulic pressure control unit, the first and second hydraulic circuits, the first and second backup flow paths, and the first inspection flow path, and the electronic control unit compares a hydraulic pressure value detected by the circuit pressure sensor and a hydraulic pressure value detected by the cylinder pressure sensor and determines whether there is a leakage.

14. An operation method of the electronic brake system of claim 10, comprising a second inspection mode in which whether there is a leakage in the integrated master cylinder or a simulator valve is inspected, wherein, in the second inspection mode, the inspection control valve is opened to communicate the pressure chamber with the first master chamber by the second inspection flow path, and the hydraulic piston is operated to generate the hydraulic pressure in the pressure chamber, and the electronic control unit determines whether there is a leakage on the basis of an amount of displacement of the hydraulic piston.

* * * * *